United States Patent
O'Brien

(10) Patent No.: US 8,186,430 B2
(45) Date of Patent: *May 29, 2012

(54) METHOD AND SYSTEM FOR EXTRACTION OF HYDROCARBONS FROM OIL SANDS

(75) Inventor: Thomas B. O'Brien, Seattle, WA (US)

(73) Assignee: Shale and Sands Oil Recovery LLC, St. Augustine, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/090,819

(22) Filed: Apr. 20, 2011

(65) Prior Publication Data

US 2011/0198085 A1 Aug. 18, 2011

Related U.S. Application Data

(63) Continuation of application No. 12/279,256, filed as application No. PCT/US2007/004852 on Feb. 23, 2007, now Pat. No. 7,931,080.

(60) Provisional application No. 60/776,435, filed on Feb. 24, 2006.

(51) Int. Cl.
*E21B 43/24* (2006.01)
*E21B 43/243* (2006.01)

(52) U.S. Cl. ............. 166/247; 166/256; 166/272.1; 166/272.2; 166/272.3; 166/272.7; 166/303

(58) Field of Classification Search ................. None
See application file for complete search history.

(56) References Cited

U.S. PATENT DOCUMENTS

| | | | |
|---|---|---|---|
| 2,685,930 A | 8/1954 | Albaugh | |
| 3,233,670 A | 2/1966 | Thompson et al. | |
| 3,237,689 A | 3/1966 | Justheim | |
| 3,246,695 A | 4/1966 | Robinson | |
| 3,283,814 A | 11/1966 | Schlict et al. | |
| 3,598,182 A | 8/1971 | Justheim | |
| 3,766,982 A | 10/1973 | Justheim | |
| 4,000,038 A | 12/1976 | Moser | |
| 4,124,074 A | 11/1978 | Allen et al. | |
| 4,144,935 A | 3/1979 | Bridges et al. | |
| 4,384,614 A | 5/1983 | Justheim | |
| 4,410,216 A * | 10/1983 | Allen | 299/2 |
| 4,678,039 A | 7/1987 | Rivas et al. | |
| 5,124,008 A | 6/1992 | Rendall et al. | |
| 5,273,111 A * | 12/1993 | Brannan et al. | 166/245 |
| 7,445,041 B2 * | 11/2008 | O'Brien | 166/247 |
| 7,931,080 B2 * | 4/2011 | O'Brien | 166/247 |
| 2003/0146002 A1 | 8/2003 | Vinegar et al. | |
| 2007/0095536 A1 | 5/2007 | Vinegar et al. | |
| 2007/0293404 A1 | 12/2007 | Hutchins et al. | |

OTHER PUBLICATIONS

Brain, Marshall, and Robert Lamb. "How Nuclear Power Works" Oct. 9, 2000. HowStuffWorks.com. <http://science.howstuffworks.com/nuclear-power.htm> Sep. 23, 2010.

* cited by examiner

*Primary Examiner* — George Suchfield

(74) *Attorney, Agent, or Firm* — Mark S. Leonardo; Brown Rudnick LLP

(57) ABSTRACT

A system and method for extracting hydrocarbon products from oil sands using nuclear energy sources for power to decrease the viscosity of bitumen in oil sands deposits and provide sufficient heat and pressure to produce liquid and gaseous hydrocarbon products. Steps for extracting the hydrocarbon products form the oil sands deposits are disclosed.

11 Claims, 12 Drawing Sheets

METHOD AND SYSTEM FOR EXTRACTION OF HYDROCARBONS FROM OIL SANDS

CROSS REFERENCE TO RELATED APPLICATION

This patent application is a continuation of U.S. application Ser. No. 12/279,256 filed in the U.S. Patent and Trademark Office on Dec. 23, 2008 by Thomas B. O'Brien, now U.S. Pat. No. 7,931,080, which claims priority to PCT/US2007/004852, filed on Feb. 23, 2007, which claims the benefit of U.S. Provisional Patent Application Ser. No. 60/766,435, filed on Feb. 24, 2006, the entire contents of each of these applications being incorporated herein by reference in their entireties.

FIELD OF THE INVENTION

The present invention relates to using alternative energy sources to create a method and system that minimizes the cost of producing useable hydrocarbons from oil sands. The advantageous design of the present invention, which includes a system and method for the recovery of hydrocarbons, provides several benefits including minimizing energy input costs, limiting water use and reducing the emission of greenhouse gases (GHG) and other emissions and effluents, such as carbon dioxide and other gases and liquids.

BACKGROUND OF THE INVENTION

Oil sands (also referred to as tar sands or bituminous sands) are a naturally occurring combination of clay, sand, water, and bitumen, which is a heavy black viscous oil. Oil sands can be mined and processed to extract bitumen, which is upgraded into synthetic crude oil or refined directly into petroleum products.

Most of the world's oil, in excess of 5 trillion barrels, is in the form of oil sands. The largest deposits of oil sands are found in Alberta, Canada and Venezuela. In the United States, oil sands resources are primarily concentrated in Eastern Utah. The oil sands resources in Utah are estimated at being in the range 12 to 20 billion barrels of oil.

The bitumen in oil sands typically cannot be pumped from the ground in its natural state. Oil sands deposits are mined or produced using in situ ("in place") recovery methods. In one known surface mining method, oil sands deposits near the surface are recovered by open pit mining techniques, which use large hydraulic/electric powered shovels to remove oil sands and load trucks for transport to an extraction plant, which includes a hot water process that separates the bitumen from the sand, water and minerals. After the hot water is added to the oil sands, the resulting slurry is piped to the extraction plant where it is agitated, with for example a caustic agent such as NaOH, to release bitumen from the oil sand. The bitumen is transported for upgrading and/or refining, however, bitumen is much thicker than traditional crude oil so it can be mixed with lighter petroleum or chemically altered to facilitate transport.

Surface mining methods may also include other enhancements such as tailings oil recovery (TOR) that recovers oil from the tailings of the oil sands, diluent recovery units to recover naptha from the froth of the slurry, inclined plate settlers (IPS) and disc centrifuges. These surface attempts to extract hydrocarbon products from oil sands have been, however, costly, energy intensive and inefficient. Further, these methods can create negative environmental impacts due to the clearing of trees and other disruption of the top layer of earth to expose oil sands deposits. In addition, it has been established that approximately 80% of all oil sands deposits are too deep to be recovered using traditional surface mining methods.

Attempts have been made to overcome the drawbacks of prior known surface mining methods of recovery, and to extract subterranean oil sands deposits, by employing in situ processes. These techniques may include steam injection, solvent injection and firefloods, in which oxygen and/or air is injected and part of the resource burned to provide heat. In one in-situ technique, a cyclic steam stimulation method (CSS) is employed whereby a producing well is cycled through steam injection, soak and oil production. Steam is injected into the well at a temperature of approximately 300 degrees Celsius for a period of weeks to months. The well sits for days to weeks such that heat soaks into the formation. Then, hot oil is pumped out of the well for a period of weeks or months. As the production rate falls, the well is cycled through another procedure of injection, soak and production. The process is repeated until the cost of injecting steam outweighs the value of the produced oil.

In another in-situ technique, a steam assisted gravity drainage method (SAGD) is used that employs directional drilling whereby two horizontal wells are drilled in the oil sands, a lower well at the bottom of the formation and an upper well above it. In each well pair, steam is injected into the upper well to heat the bitumen, lowering the viscosity such that the bitumen flows into the lower well and is pumped to the surface. In a similar technique, a vapor extraction process (VAPEX) uses hydrocarbon solvents, alternative to steam or mixed with steam, which are injected into the upper well to dilute the bitumen, which flows into the lower well. In a fireflood technique, a toe to heel air injection method (THAI) employs a vertical air injection well with a horizontal production well whereby oil in the reservoir is ignited to create a vertical wall of fire moving from the "toe" of the horizontal well toward the "heel." This process burns the heavier oil components and drives the lighter components into the production well to be pumped to the surface.

After bitumen is extracted, bitumen can be upgraded for processing in refineries. Upgrading includes removing carbon from the bitumen while adding hydrogen to produce a more valuable hydrocarbon product such as synthetic crude oil, which may be shipped to a refinery, by for example underground and above ground pipelines. The oil can be further refined into aviation fuels, gasoline, diesel fuel, and other petroleum products and petroleum chemical products such as plastics, fleece, toothpaste, etc.

These known in-situ methods of bitumen extraction, however, suffer from various drawbacks and disadvantages. For example, the above described techniques can be expensive, including high energy costs for the large amount of energy required, require large amounts of water, as well as negative environmental impacts. These impacts may include global warming, greenhouse gas emissions and disturbance of land, as well as impacts on wildlife, air and water quality.

Oil sands production as currently practiced releases significant quantities of carbon dioxide, which is a contributor to GHG emissions linked to global warming. A large contributor to GHG emissions growth in Canada is oil sands production. Aggressive growth in oil sands recovery signals a need for focus on reducing GHGs. Annual emission from the oil sands production are projected to grow from approximately 40 megatons to over 100 megatons by 2015. Further, there are large reservoirs of waste water from oil sands extraction processes that cannot be released into the surface water supply or reinjected underground because of contaminants.

These known surface mining and in-situ methods also require significant inputs of energy. The upgraders and refineries, which extract hydrocarbons from oil sands and bitumen, are fueled by finished hydrocarbons resulting in substantial atmospheric pollution and use of non-renewable resources. Also, there is an environmental tradeoff characterized by combusting more finished hydrocarbons such as natural gas, to remediate waste water and other waste streams from the existing processes being used.

Therefore, it would be desirable to overcome the disadvantages and drawbacks of the prior art with a method and system for recovering hydrocarbon products from formations, such as oil sands, which heat the oil sands via thermal and/or electrically induced energy produced by a nuclear reactor. Further, the ancillary and auxiliary uses of energy including, but not limited to feed water treatment, waste water treatment, produced water treatment, bitumen upgrading, synthetic crude oil (SCO) refining, hydrogen production, electric energy production, disposal methods, petrochemical production, fracturing of oil sands deposits, enhancing gasification (including thermal energy and air separation) and greenhouse gases sequestration, among others, can be accomplished using nuclear energy sources. It is most desirable that the method and system of the present invention is advantageously employed to minimize energy input costs, limit water use and reduce the emission of greenhouse gases and other emissions and effluents, such as carbon dioxide and other gases and liquids, and to minimize environmental impacts from oil sands oil production.

SUMMARY OF THE INVENTION

Accordingly, a method and system is disclosed for extracting hydrocarbon products from formations, such as oil sands, using alternative energy sources, which heat the oil sands via thermal and/or electrically induced energy produced by a nuclear reactor for overcoming the disadvantages and drawbacks of the prior art. Desirably, the method and system can provide ancillary and auxiliary uses of energy including, but not limited to feed water treatment, waste water treatment, produced water treatment, bitumen upgrading, SCO refining, hydrogen production, electric energy production, disposal methods, petrochemical production, fracturing of oil sands deposits, enhancing gasification (including thermal energy and air separation) and greenhouse gases sequestration, among others, by using nuclear energy sources. The method and system may be advantageously employed to minimize energy input costs, limit water use and reduce the emission of greenhouse gases and other emissions and effluents, such as carbon dioxide and other gases and liquids, and to minimize environmental impacts.

The present invention provides a system and method for extracting hydrocarbon products from oil sands. An embodiment of the present invention uses nuclear energy to provide thermal and electric energy to decrease the viscosity of the oil sands and provide sufficient heat and pressure to extract bitumen from the oil sands. The nuclear energy source also provides energy for other primary, secondary and auxiliary site and off site operations. Embodiments of the present invention also disclose auxiliary steps for extracting hydrocarbons from the oil sands deposits, treating and purifying feed water, discharge water and produced water, for operation of disposal wells, to create hydrogen for upgrading and refining operations, for utilizing off gases for petrochemical production, fracturing of oil sands deposits, enhancing gasification (including thermal energy and air separation) and for sequestration of greenhouse gas emissions and other emissions.

In the method and system for extracting hydrocarbon products from oil sands it is contemplated that supercritical material will be injected into the formation to produce fracturing and porosity that will maximize the production of useful hydrocarbons from the oil sands formation. The use of a nuclear reactor may reduce energy input cost as compared to employing finished hydrocarbons to produce thermal energy and/or electricity. Nuclear reactors produce the supercritical temperature in the range from 200° to 1100° C. (depending on the material to be used) necessary for increasing the pressure used in the fracturing process compared to conventional hydro fracturing and/or the use of explosives. In oil sand formations, the maximization of fracturing is advantageous to hydrocarbon accumulation and recovery.

In one particular embodiment, in accordance with the present disclosure, a method for recovering hydrocarbon products is provided. The method includes the steps of producing thermal and electric energy using a nuclear reactor; providing thermal energy to a hot material generator; providing a material to the hot material generator; producing a hot material flow from the hot material generator using a high pressure pump; delivering the hot material flow into wells wherein the wells are disposed in an oil sands formation; injecting the hot material flow into the oil sands formation from the wells to reduce the viscosity of bitumen of the oil sands formation such that the bitumen is caused to flow; and recovering bitumen from the oil sands formation using the hot material flow from the wells.

The method may further include the step of soaking the oil sands formation with the injected hot material flow for a period of time. The method may also include the steps of: converting the thermal energy of the nuclear reactor into electrical energy; and powering the high pressure pumps and other operations with the electrical energy. The method may further include the step of providing a material that includes providing a solvent. The step of producing hot material flow can include producing high pressure steam.

The method may further include the step of constructing an infrastructure in the oil sands formations. The infrastructure is formed by vertically oriented drilling, relative to a site, for disposal of the wells. The method may further include the step of constructing an infrastructure in the oil sands formation, whereby the infrastructure is formed by drilling horizontal wells in the oil sands formation. The wells may include an upper well and a lower well.

The method may further include the step of delivering whereby the heated material flow is delivered into the upper well and the step of injecting includes injecting the heated material flow into the oil sands formation from the upper well, and the step of recovering includes recovering bitumen that flows into the lower well. The step of delivering the heated material flow into the upper well may include delivering a hydrocarbon solvent to the upper well. The method may further include the step of upgrading the bitumen for processing to produce hydrocarbon products.

In an alternate embodiment, a method of recovering bitumen from an oil sands formation is provided, which includes the steps of: producing thermal energy using a nuclear reactor; providing the thermal energy to a hot material generator; providing water to the hot material generator; producing a high pressure steam flow from the hot material generator using a high pressure pump; converting the thermal energy of the nuclear reactor into electrical energy; powering the high pressure pumps with the electrical energy; constructing an infrastructure in the oil sands formation for disposal of wells; delivering the high pressure steam flow into the wells wherein the injection wells are disposed in an oil sands formation and the high pressure steam is injected into a thermal area of the oil sands formation; injecting the high pressure steam flow into the thermal area from the wells to reduce the viscosity of bitumen of the oil sands formation such that the bitumen is caused to flow; recovering bitumen from the oil sands from the wells; and upgrading the bitumen for processing to produce hydrocarbon products.

In another alternate embodiment, a method for recovering bitumen from an oil sands formation is provided, including the steps of producing thermal energy using a nuclear reactor; providing the thermal energy to a hot air generator; providing air to the hot air generator; producing a high pressure hot air flow from the hot air generator using a high pressure pump; converting the thermal energy of the nuclear reactor into electrical energy; powering the high pressure pumps with the electrical energy; constructing an infrastructure in the oil sands formation, the infrastructure being formed by drilling a vertical well and a horizontal well in the oil sands formation; delivering the high pressure hot air flow into the vertical well wherein the vertical well is disposed in the oil sands formation; injecting the high pressure hot air flow into a thermal area of the oil sands formation from the vertical well so that the oil sands formation is ignited releasing thermal energy such that the viscosity of bitumen of the oil sands formation causes the bitumen to flow; and recovering the bitumen that flows into the horizontal well.

In another alternate embodiment, a method for recovering bitumen from an oil sands formation is provided, including the use of combination of technologies to provide hydrogen as an alternative to reformation of natural gas to produce hydrogen. A key component is a gasification facility which is integrated with the bitumen upgrading to convert the liquid asphaltene by-product stream into hydrogen for the secondary upgrading step and syngas fuel. An air separation unit (ASU) can provide high purity oxygen and other utility services to the upgrader. The combination of technologies including primary upgrading process and a hydrocracker, can result in an integrated project that will produce premium synthetic crude oil.

Oil sands geologic formations, particularly in Canada, have the potential to produce billions of barrels of useful hydrocarbons from the production of bitumen. Bitumen is a heavy, viscous form of crude oil mixed with sand. It also may be upgraded and made into smaller hydrocarbons through the introduction of hydrogen into the upgrading process. Once bitumen is upgraded it is considered SCO, which can then be refined into useful hydrocarbons including gasoline, diesel fuel, aviation fuels and others.

Prior known methods, both surface mining and in situ recovery, entail the significant use of water. Typically, water is drawn from surface waters or underground aquifers. That water is treated before becoming feed water for extraction or upgrading processes and treated for discharge into surface water or underground disposal. Accordingly, a method and system of the present invention is disclosed for recovering hydrocarbon products from oil sands formations including but not limited to treatment of water to be suitable as feed water, treatment of water effluents such that it can be released, treatment of produced water, and discharge of treated wastewater into surface waters or being injected into the geologic formation.

Off gas streams from the upgrading process can be used as feedstock for petrochemical operations to produce more useful products including synthetic gas liquids, which have economic value. Further, streams of greenhouse gases, including carbon dioxide, may be sequestered in underground deposits in order to avoid release into the atmosphere. Accordingly, a method and system of the present invention is disclosed for recovering hydrocarbon products from oil sands formations including but not limited to the use of energy from a nuclear reactor for petrochemical processes using off-gas streams from upgrading or refining, and use of the energy from the nuclear reactor to support sequestration activities.

BRIEF DESCRIPTION OF THE DRAWINGS

The present invention, both as to its organization and manner of operation, will be more fully understood from the following detailed description of illustrative embodiments taken in conjunction with the accompanying drawings in which.

DETAILED DESCRIPTION

The exemplary embodiments of the method and system for extracting hydrocarbon products, such as bitumen, from formations, such as oil sands, using alternative energy sources, which heat the oil sands via thermal or electrically induced energy are discussed in terms of recovering hydrocarbon products from oil sands and more particularly, in terms of recovering such hydrocarbon products from the oil sands via thermal energy produced by a nuclear reactor. The method and system of recovering hydrocarbons may provide ancillary and auxiliary uses of energy including, but not limited to feed water treatment, waste water treatment, produced water treatment, bitumen upgrading, SCO refining, hydrogen production, electric energy production, disposal methods, petrochemical production, fracturing of oil sands deposits, enhancing gasification (including thermal energy and air separation) and greenhouse gases sequestration, among others, by using nuclear energy sources. It is contemplated that such a method and system as disclosed herein can be employed to minimize energy input costs, limit water use and reduce the emission of greenhouse gases and other emissions and effluents, such as carbon dioxide and other gases and liquids. See, for example, the paper *Nuclear Technology and Canadian Oil Sands: Integration of Nuclear Power and in situ Oil Extraction*, G. Becerra et al, MIT-NES-DES-005, December 2005, the contents of which being hereby incorporated by reference herein in its entirety. The use of a nuclear reactor to produce thermal energy reduces energy input costs and avoids reliance on finished hydrocarbon products to produce thermal energy and the related drawbacks associated therewith and discussed herein. It is envisioned that the present disclosure may be employed with a range of recovery applications for oil sands extraction including other in situ techniques and surface production methods. It is further envisioned that the present disclosure may be used for the recovery of materials other than hydrocarbons or their precursors disposed in subterranean locations. The present disclosure may also be used for hard rock mining including metals such as gold, copper, molybdemen, uranium and others.

Figure 1:
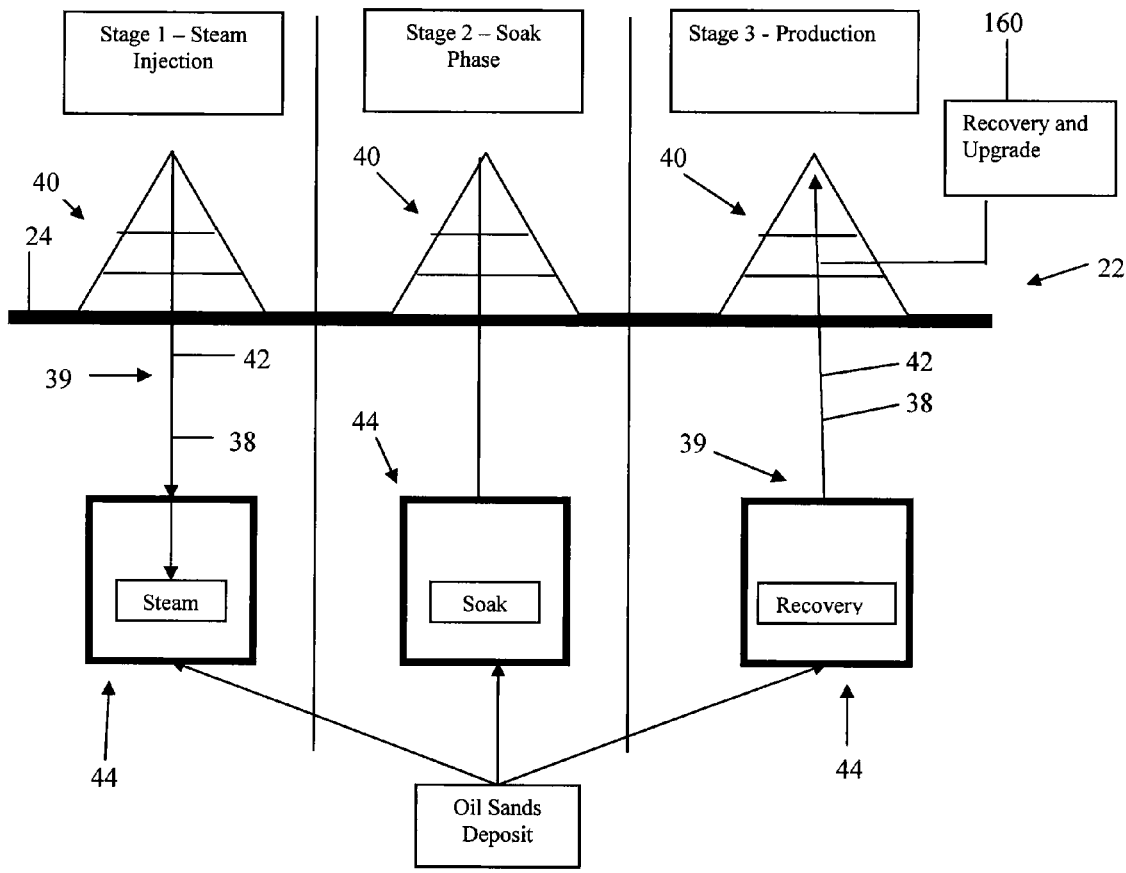
FIG. 1 is a schematic diagram of a method and system for producing energy products from oil sands using a nuclear energy source in accordance with the principles of the present invention.
Figure 2:
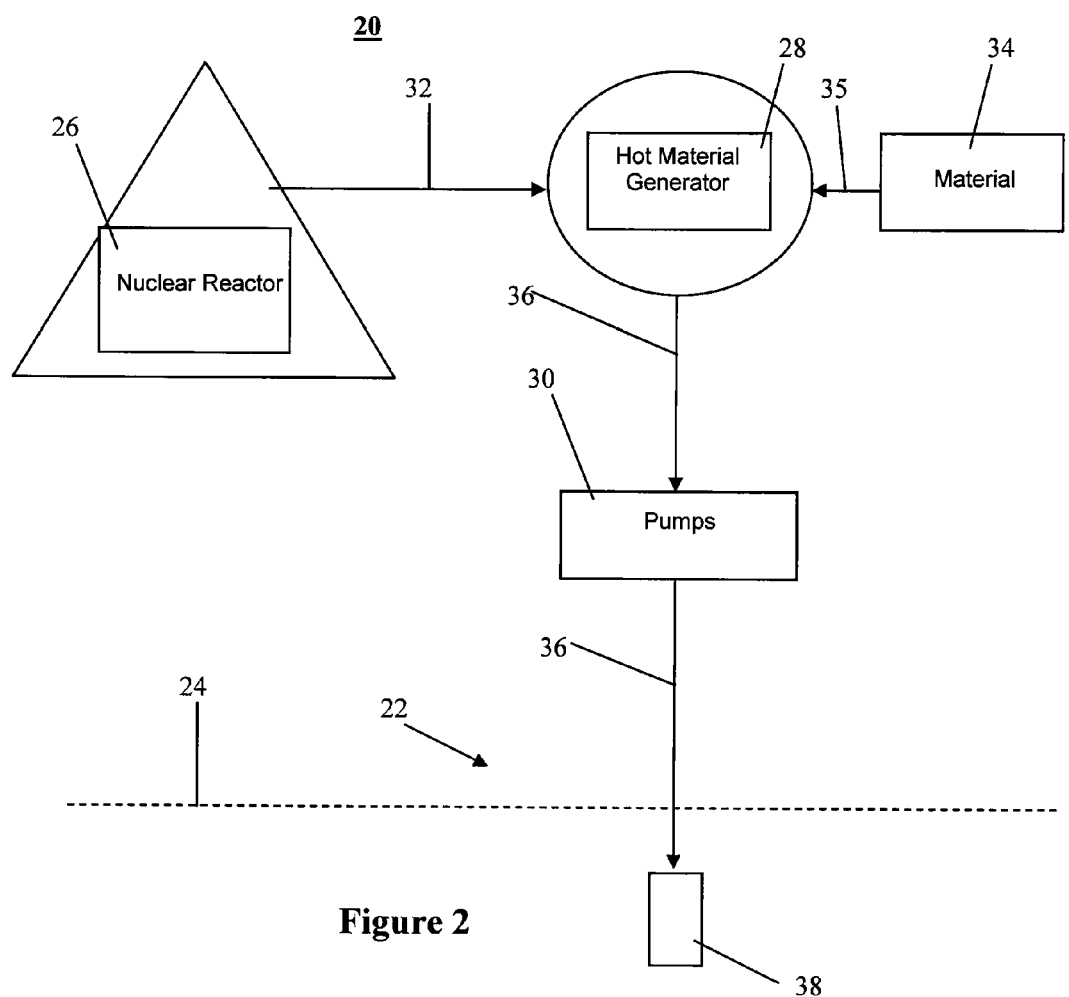
FIG. 2 is a schematic diagram of the components of the method and system shown in FIG. 1, in the injection stage.

The following discussion includes a description of the method and system for recovering hydrocarbons in accordance with the principles of the present disclosure. Alternate embodiments are also disclosed. Reference will now be made in detail to the exemplary embodiments of the present disclosure, which are illustrated in the accompanying figures. Turning now to FIGS. 1 and 2, there is illustrated a method and system for recovering hydrocarbon products, such as, for example, a system 20 for processing of oil sands and extraction of bitumen using a nuclear reactor and an associated thermal transfer system, in accordance with the principles of the present disclosure.

The nuclear reactor and thermal components of system 20 are suitable for recovery applications. Examples of such nuclear reactor and thermal components are provided herein, although alternative equipment may be selected and/or preferred, as determined by one skilled in the art.

Detailed embodiments of the present disclosure are disclosed herein, however, it is to be understood that the described embodiments are merely exemplary of the disclosure, which may be embodied in various forms. Therefore, specific functional details disclosed herein are not to be interpreted as limiting, but merely as a basis for the claims and as a representative basis for teaching one skilled in the art to variously employ the present disclosure in virtually any appropriately detailed embodiment.

In one aspect of system 20 and its associated method of operation, an oil extraction site 22 is selected for recovery of bitumen. Site selection for the oil sand reservoirs can be based on the presence of bound formation water, which enables the bitumen to be recovered more easily since the bonding forces between the bitumen and water are much weaker than those between the water and the sand grains. Viscosity, permeability, and reservoir thickness are contributing parameters to the evaluation of a reservoir. See, for example, the paper *Canada's Oil Sands Resources and its Future Impact on Global Oil Supply*, Bengt Soderbergh, Uppsala University (2005), the contents of which being hereby incorporated by reference herein in its entirety.

It is contemplated that various secondary and tertiary recovery techniques may be employed to enhance the natural flow of bitumen. These techniques may include increasing the porosity of the strata, reducing the viscosity of the fluids, or inducing a driving force on the fluids, by increasing the pressure in the reservoir. It is envisioned that the present method will remove the hydrocarbons from the oil sands and leave the minerals behind. The present system 20 and method can also reduce bitumen viscosity by introducing a solvent, or heat the reservoir, either by steam or combustion of residual hydrocarbons. It is envisioned that permeability can be induced by fracturing equipment and procedures, however, the natural permeability of the oil sands is a relevant characteristic in selecting the site.

It is envisioned that a high-quality reservoir is characterized by high permeability, high pay thickness, no bottom water and little shale. Recovery of bitumen from the oil sands deposits can be in the range of 87-90+%, which is dependent on ore quality.

Site selection can also be based on subsurface mapping using existing borehole data such as well logs and core samples and ultimately data from new holes drilled in a regular grid. Geophysical well log data where available, including resistivity, conductivity, sonic logs and so forth may be employed. Seismic data is desirable; however, core analysis is a reliable method of determining actual porosity and permeability, which is related to both efficient heating and extraction of the end product, hydrocarbons. Three dimensional computer modeling may be provided.

Other factors to be considered include ore thickness, grade, clay content, and the extent of reject zones are also important parameters to be considered in the economic evaluation of a potential oil sands recovery project. The thickness of overburden, ore, and center reject can be combined to give a waste to ore ratio, (thickness of overburden plus reject zones, divided by the ore thickness), which can be used as an economic indicator of the cost of delivering a unit of ore to the extraction plant. The bitumen content and clay content give an indication of the amount of bitumen that can be recovered from the unit of ore, which provides an indication of the value of that unit.

At selected site 22, a surface level 24 is drilled for extraction of core samples (not shown) using suitable drilling equipment for an oil sands application, as is known to one skilled in the art. The core samples are extracted from site 22 and geological information is taken from the core samples. These core samples are analyzed to determine if site 22 selected is suitable for recovery of bitumen from the oil sands formation. After a mineable area has been outlined, the amount of ore in place can be analyzed to determine the optimum size of operation. Various volumetric estimate methods are utilized. Oil sands can be regarded as 'ore' where there is a deposit of sufficient size to feed a hot water plant or other methods of extraction profitably. This definition will vary with changes in technology and the international price of oil.

If the core samples have the desired characteristics, site 22 will be deemed suitable for attempting to extract bitumen from the oil sands. Accordingly, a strategy and design is formulated for constructing injection/production wells, as will be discussed below. Placement of a nuclear reactor 26 will also be formulated and planned for implementation, as well any other infrastructure placements necessary for implementation of the system and method. It is contemplated that if the core samples taken from the selected site are not found to have the desired characteristics, an alternate site may be selected. Site 22 is also prepared for installation and related construction of a hot material generator 28 and other components including high pressure pumps 30 and drilling equipment (not shown).

In another aspect of system 20, installation and related construction of nuclear reactor 26 and the components of the thermal transfer system at site 22 is performed, as is known to one skilled in the art.

Nuclear reactor 26 can be a thermal energy source and/or an electrical energy source employed to provide the thermal energy to decrease the viscosity of the oil sands formation to release the bitumen in the oil sands formation, as well as provide thermal energy and electrical energy for other auxiliary and primary site operations. Plumbing equipment (not shown) is constructed and installed. A material supply 34 is connected to the plumbing equipment and the components of the thermal transfer system. Electrical equipment (not shown) is wired and installed. Off-site electric connections (if available) are made to the electrical equipment. If off-site electric connections are not available, then a small stream of energy from the nuclear reactor may be generated using a conventional electric generator (not shown). It is contemplated that plumbing equipment and electrical equipment are employed that are suitable for an oil sands extraction application and more particularly, for recovery of hydrocarbons and treatment of their precursors, as is known to one skilled in the art.

It is envisioned that nuclear reactor 26 may be a small or large scale nuclear reactor employed with system 20 in accordance with the principles of the present disclosure. Nuclear reactor 26 is a thermal source used to provide thermal energy 32 to generate steam for injection with an oil sands formation (not shown). Nuclear reactor 26 may be sized to be located at or near the oil sands formation of site 22. It is envisioned that the thermal rating of nuclear reactor 26 is between 20 MWth to 1200 MWth. For example, a nuclear reactor, such as the Toshiba 4S reactor, may be used. These reactors can include all generation III, III+ and IV reactors, including but not limited to Pressurized Water Reactors, Boiling Water Reactors, CANDU reactors, Advanced Gas Reactors, ESBWR, Very High Temperature Reactors, helium or other gas cooled reactors, liquid sodium cooled reactors, liquid lead cooled rectors or other liquid metal cooled reactors, molten salt reactors, super critical water reactors, and all next generation nuclear plant designs.

Hot material generator 28 may be constructed and installed at or near site 22, as is known to one skilled in the art. Nuclear reactor 26 is coupled to hot material generator 28, as is known to one skilled in the art, for the transfer of thermal energy 32. Material supply source 34 delivers water 35 to hot material generator 28. System 20 employs hot material generator 28, in cooperation with nuclear reactor 26 as the thermal source, to produce steam 36 for injection with the oil sands formations. Hot material generator 28 delivers a material that will heat the oil sands in an upper region of a thermal area, which will decrease the viscosity of the bitumen in situ (or in secondary operations). The material from material supply source 34 can include, but not be limited to steam, nitrogen, methane, ethane, propane, butane, air, carbon dioxide, natural gas, flue gas, oxygen, nitrogen, acetic acid and/or other solvents. Other vapor extraction materials are also included. The injected material may also be used to support a fire flood technology as well.

Systems to manage the extremely high pressures may be installed to safely operate the entire system 20. Placement of blowout preventers and pressure relief valves will be integrated into system 20 and monitored at the outset of testing the process.

High pressure pumps 30 are installed at site 22 and coupled to hot material generator 28 for injecting steam 36 into the oil sands formations. High pressure pumps 30 deliver steam 36 to injection/production wells 38 at high pressure. Steam 36 is delivered at high pressures to the oil sands formations to maximize heating of the formations. It is envisioned that high pressure pumps 30 deliver pressures in the range between 50 and 500 MPa or higher. These pumps may be centrifugal or other types of pumps. The high pressure pumps and required remote pumping stations (not shown) may be designed for remote operation using the pipeline SCADA (Supervisory Control and Data Acquisition) systems and may be equipped with protection equipment such as intake and discharge pressure controllers and automatic shutoff devices in case of departure from design operating conditions. Multiple pumps and multiple gases can be used to maximize the effectiveness of the release of bitumen from the oil sands formations.

It is further envisioned that optimal injection parameters can be determined based on the formation characteristics and other factors, as geologic environments can vary locally and regionally. As well as discussed above, system 20 may include various high pressure pump configurations such as a series of multiple pumps to achieve optimal results. The described material distribution system is constructed and installed at site 22, as is known to one skilled in the art. All systems are tested and a shakedown integration is performed.

An infrastructure 39 for injection/production wells 38 is constructed at site 22. A drilling rig 40 with equipment designed for accurate directional drilling is brought on site. Truck mounted rigs can drill to depths of 2200 feet or more of site 22, as is known to one skilled in the art. Drilling rig 40 is disposed adjacent a surface 24 of site 22, which may be disposed at orthogonal or angular orientations relative to surface 24, to form a vertical drill hole 42. Injection/production wells 38 are installed with infrastructure 39 of site 22. Injection/production wells 38 inject steam 35 into drill holes 42 of the oil sands formation and site 22.

The configuration of vertical drill holes 42 can be formulated based on geological characteristics of the oil sands formation as determined by core drilling and geophysical investigation. These characteristics include depositional unconformities, orientation of the bedding planes, as well as structural disruptions within site 22 as a consequence of tectonics. Existing weaknesses in the oil sands formations may be exploited including depositional unconformities, stress fractures and faulting.

A thermal area 44 is mapped out to define a space of the oil sands formation at site 22 for thermal application of system 20. Thermal area 44 defines a location for disposition of injection/production wells 38 to introduce the thermal energy from injected steam 36 from pumps 30. Such thermal energy decreases the viscosity of the bitumen of the oil sands formations for recovery as discussed.

Figure 3:
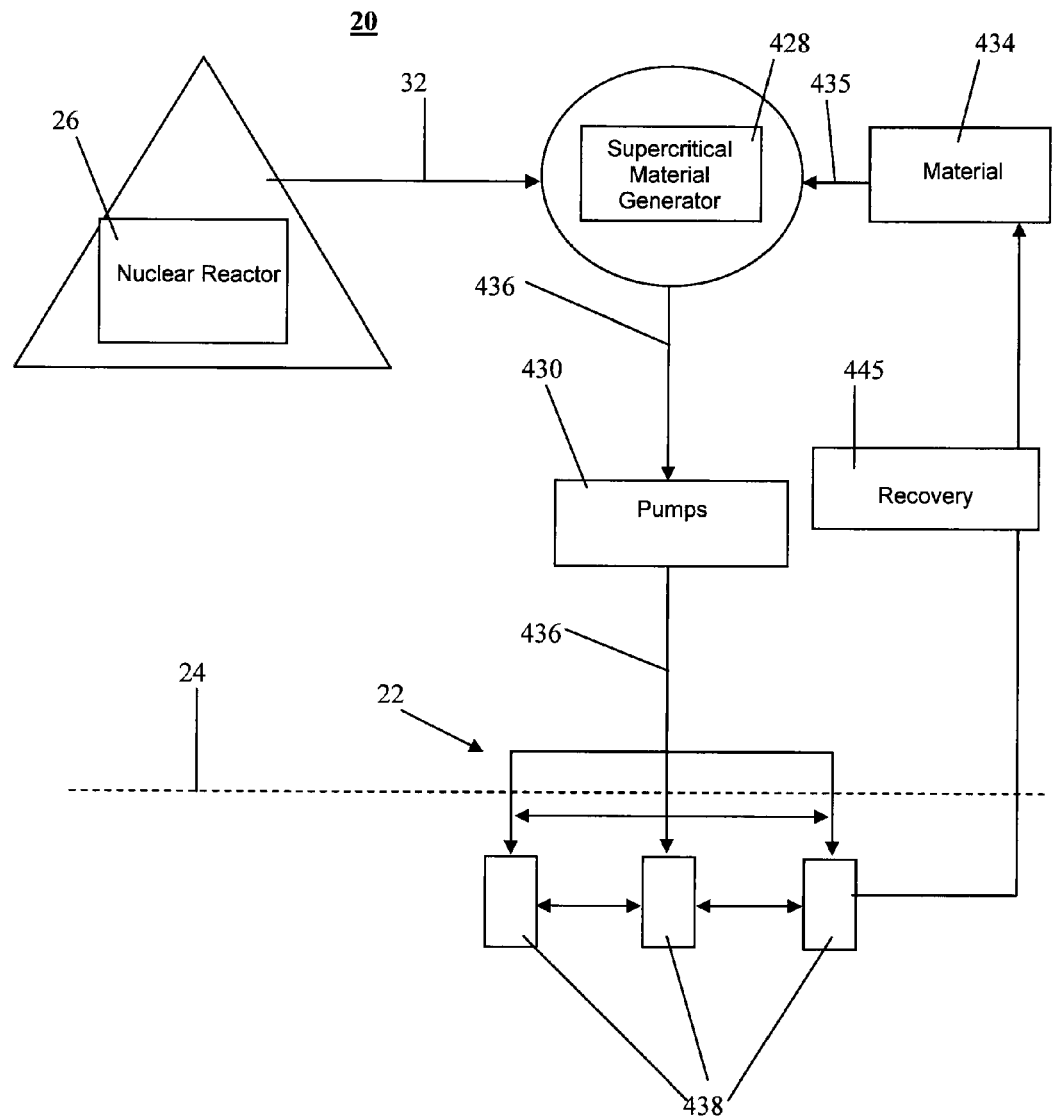
FIG. 3 is a schematic diagram of an alternate embodiment of the components of the method and system for fracturing oil sands formations shown in FIG. 1.

Referring to FIG. 3, in an alternate embodiment of system 20, similar to that described with regard to FIGS. 1 and 2, a supercritical material generator 428 is constructed and installed at site 22. Nuclear reactor 26 is coupled to supercritical material generator 428, as is known to one skilled in the art, for the transfer of thermal energy 32. It is envisioned that the thermal rating of nuclear reactor 26 is between 20 MWth to 3200 MWth.

Material supply source 434 delivers material 435 to supercritical material generator 428. System 20 employs supercritical material generator 428, in cooperation with nuclear reactor 26 as the thermal source, to produce supercritical material 436 for fracturing oil sand formations. It is contemplated that a number of materials may be generated by supercritical material generator 428 for fracturing, such as water, carbon dioxide and nitrogen, among others.

The use of supercritical material 436 is employed to enhance permeability and porosity of the oil sand formation through fracturing. See, for example, the discussion of fracturing, in the paper from the 14th International Conference on the Properties of Water and Steam in Kyoto, *Mathematical Model of the Laboratory Experiment that Simulates the Hydraulic Fracturing of Rocks under Supercritical Water Conditions*, Sergei Fomin, Shin-ichi Takizawa and Toshiyuki Hashida, Fracture and Reliability Research Institute, Tohoku University, Sendai 980-8579, Japan), the contents of which being incorporated by reference herein in its entirety.

High pressure pumps 430 are installed at site 22 and coupled to supercritical material generator 428 for injecting supercritical material 436 into the oil sand formations. High pressure pumps 430 deliver supercritical material 436 to oil sand fracturing wells 438 at high pressure. Supercritical material 436 is delivered at high pressures to the oil sand formations to achieve maximum permeability in the sand. It is envisioned that high pressure pumps 430 deliver pressures in the range between 100 and 500 MPa or higher. These pumps may be centrifugal or other types of pumps. The high pressure pumps and required remote pumping stations (not shown) may be designed for remote operation using the pipeline SCADA (Supervisory Control And Data Acquisition) systems and may be equipped with protection equipment such as intake and discharge pressure controllers and automatic shut-off devices in case of departure from design operating conditions. It is contemplated that oil sand fracturing wells 438 may also include production wells, which are coupled to bitumen recovery system 160.

It is further envisioned that an optimal injection parameters can be determined based on the formation characteristics and other factors. Geologic environments can vary locally and regionally. As well as discussed above, system 20 may include various high pressure pump configurations such as a series of multiple pumps to achieve optimal results. The described supercritical material distribution system is constructed and installed at site 22, as is known to one skilled in the art. All systems are tested and a shakedown integration is performed.

Infrastructure 39 is constructed for fracturing wells 438 at site 22, as shown in FIG. 1. Drilling rig 40 with equipment designed for accurate directional drilling is brought on site. Drilling rig 40 is disposed adjacent vertical drill hole 42 from which horizontal drill holes, which may be disposed at orthogonal, angular or non-orthogonal orientations relative to vertical drill hole 42, are formed. Oil sand fracturing wells 438 (in place of injection/production wells 38) are installed with infrastructure 39 of site 22. Oil sand fracturing wells 438 inject supercritical material 436 into the drill holes of the oil sand formation and site 22. Directional drilling is employed to maximize the increase in permeability and porosity of the oil sand formation and maximize the oil sand formation's exposure to induced heat.

High pressure pumps 430 deliver supercritical material 436 to fracturing wells 438 with sufficient energy to cause fracturing in the oil sand formations. Such fracturing force increases porosity and permeability of the oil sand formation through hydraulic stimulation under supercritical conditions. Residual supercritical materials from the fracturing operations are recovered via a material recovery system 445 and re-introduced to supercritical material generator 428 via material supply 434 using suitable conduits, as known to one skilled in the art. It is envisioned that a material recovery system is employed to minimize the consumption of material used to fracture the oil sand formation. A recycling system may be deployed to also minimize any groundwater pollution and recycle material where possible.

The fracturing operations employing the supercritical material distribution system described and oil sands fracturing wells 438 are initiated. Nuclear reactor 26 and the material distribution system are run. Fracturing of the oil sands formations via wells 438 is conducted to increase permeability and porosity of the oil sands formation for heat inducement. The fracturing process in the oil sands formation at site 22 is tracked via readings taken. Based on these reading values, formulations are conducted to determine when the fracturing is advanced to a desired level. It is envisioned that the fracturing level can be determined with inert material, which is circulated downhole, and reading the amount and rate of material loss to measure the leakage into the formation. Gases may also be employed with the amount of pressure loss being used to measure the degree of fracturing. These measurements would be compared to pre-fracturing level, which may be employed with microfracturing. Core samples are extracted from the fractured oil sands formation and analyzed. The analysis results are used to formulate and plan for implementation of a drilling scheme for the wells for product recovery.

Figure 4:
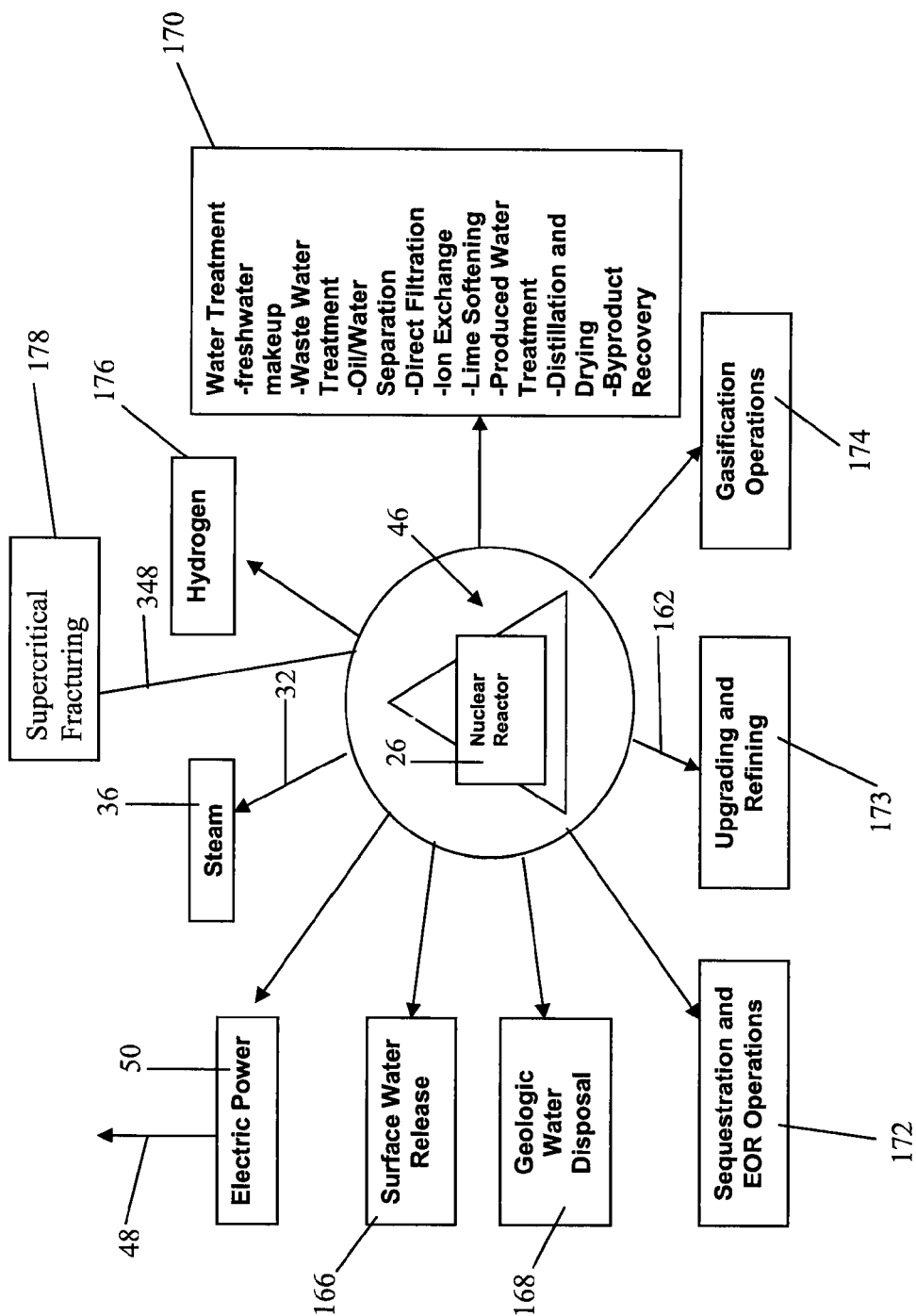
FIG. 4 is a process energy flow diagram in connection with the method and system shown in FIG. 1.
Figure 5:
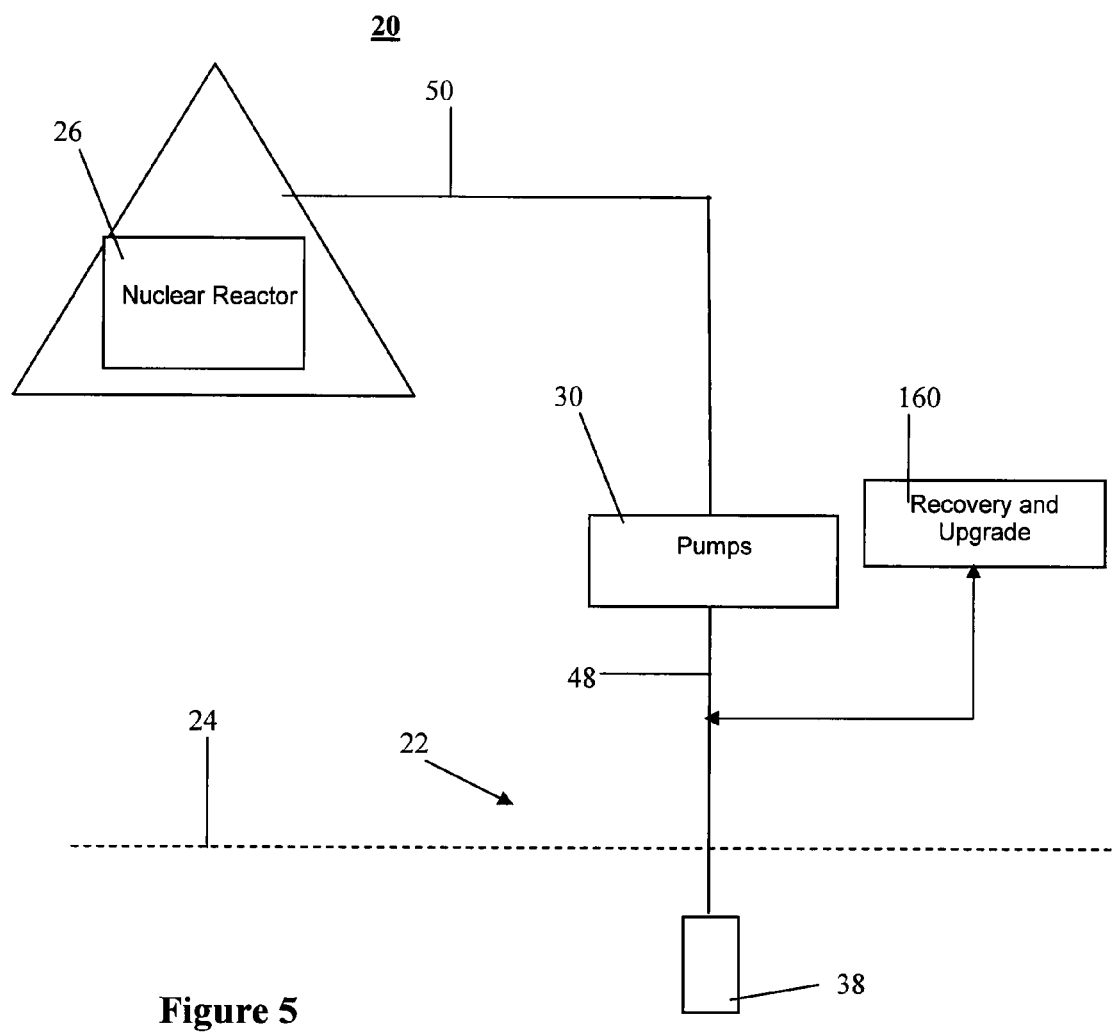
FIG. 5 is a schematic diagram of the components of the method and system shown in FIG. 1, in the production stage.

An illustration of the energy flow of system 20 for bitumen recovery operations, as shown in FIG. 4, includes nuclear energy 46 generated from nuclear reactor 26. Nuclear energy 46 creates thermal energy 32 that is transferred to hot material generator 28 for producing steam 36. Steam 36 is delivered to high pressure pumps 30. Pump energy 48 receives electric power 50 to place steam 36 under high pressure. The pump energy also delivers recovered bitumen to bitumen recovery system 160 (FIG. 3). It is envisioned that thermal energy 32 is converted into electric energy to create electric power 50, via steam generation, electric generator, etc., as is known to one skilled in the art.

High pressure pumps 30 deliver steam 36 to injection/production wells 38 to inject high pressure steam 36 to the oil sands formations of thermal area 44. Alternatively, as discussed with regard to FIG. 3 and supercritical fracturing 178, which employs supercritical material 436, nuclear energy 46 creates thermal energy 32 that is transferred to supercritical material generator 428 for producing supercritical material 436. Supercritical material 436 is delivered to high pressure pumps 430. Pump energy 448 puts supercritical material 436 under high pressure. High pressure pumps 430 deliver supercritical material 436 to fracturing wells 438 with sufficient energy to cause fracturing in the oil sand formations.

It is envisioned that nuclear reactor 26 provides thermal energy and electric energy as an energy source for auxiliary and primary sites in connection with the bitumen recovery operations. For example, nuclear energy 46 generated from nuclear reactor 26 may be employed to generate energy for surface water release 166, geologic water disposal 168 and water treatment 170. See, for example, the discussion of these processes in the paper *Potential Ground Water and Surface Water Impacts from Oil Shale and Tar Sands Energy Production Operations*, J. A. Veil and M. G. Puder, Argonne National Laboratory, ANL/EVS/R-06/9, October 2006; the paper *Technology Assessment: Environmental, Health, and Safety Impacts Associated with Oil Recovery from US Tar Sands Deposits*, J. I. Daniels, et al, Lawrence Livermore Laboratory, UCRL-53210, Oct. 13, 1981; and the paper *Troubled Waters, Troubling Trends: Technology and Policy Options to Reduce Water Use in Oil and Oil Sands Development in Alberta*, A. Taylor and D. Woynillowicz, The Pembina Institute, May 2006.

With regard to the present system 20 and the related methods disclosed, the properties and composition of oil sands and the bitumen recovered can influence the selection of recovery and treatment processes and vary among deposits. Wet sands or water-wet sands, found, for example, in the Canadian Athabasca deposit, is a layer of water that surrounds a sand grain. The bitumen partially fills the voids between the wet grains. The bitumen can be separated from the sand by using water.

Several methods of in situ production include different combinations of injecting steam or solvents through horizontal or vertical wells. Bitumen requires additional upgrading before it can be refined. With regard to system 20, this process involves two steps. The first step uses coking and catalytic conversion processes. The second step uses hydroprocessing to increase the hydrogen content of the synthetic crude oil. After upgrading, the synthetic crude oil is piped to a refinery. Because it is so viscous, bitumen normally requires dilution with lighter hydrocarbons to make it transportable by pipelines.

For in-situ oil sands production, the formations are likely to be in contact with steam or solvents that will eventually reach the ground water in the area. Water is produced during in situ production. As a result, the net water requirement to produce a cubic meter of oil with in situ production may be as little as 0.2 $m^3$, depending on how much is recycled. It is contemplated that 2 or 3 $m^3$ of produced water are available for recycling for each cubic meter of bitumen recovered. It is further contemplated that recovery methods may use fresh or saline water to generate steam. It is envisioned that saline and fresh water or treated saline water may be employed to regulate saline content.

The produced water is treated before it can be used to generate steam for in situ oil recovery. It is envisioned that various processes may be used to remove residual oil, silica (sand) and, dissolved and suspended solids. For example, system 20 includes a treatment method for the produced water, including the following steps.

In one step, the treatment method includes de-oiling. The de-oiling step removes residual bitumen. It is envisioned that this step includes passing the water first through a skim oil, tank, then through a filtration unit. Another step of the treatment method includes water treatment. The water treatment step includes removing silica in the produced water. It is contemplated that this step includes a warm or hot lime process, in which calcium and magnesium oxide are added to facilitate removal of silica.

Following treatment, the method includes the steps of filtering the water and then treating the water to avoid build up of scale in the process equipment. It is envisioned that this step includes treatment employing a weak acid cation process to remove any calcium and magnesium ions from the lime softeners. These ions are replaced with sodium ions to prevent scaling. Another step of the treatment method includes disposal of waste products. Waste products from the treatment process, which include sludge and filter waste, may be disposed of in deep wells or into a landfill.

Upon treatment, the water is heated to convert it to steam. It is envisioned that a steam generator is employed. It is contemplated that system 20 produces 80% quality steam (80% vapor and 20% liquid), which is suitable for CSS. It is further contemplated that the SAGD process requires 100% steam (with no liquid water) to avoid build-up of small amounts of dissolved solids in the water. Thus, the 20-25% residual water is removed, flashed to make steam again, condensed and fed back into the boiler feed water to make 100% steam. The small residue containing the dissolved solids is treated for reuse or disposed of in a deep disposal well.

In one embodiment, wastewater disposal reinjects the wastewater into the depleted formation. Wastewater may also be subject to treatment and released as surface water. It is envisioned that the water treatment methods of system 20 can include sedimentation pools, such as tailings ponds, in which contaminated water is allowed to have solids fall to the bottom of the pool and then the waste water can be released or injected. This process may take an extended period of time while wastewater in sedimentary pools builds up.

In an alternate embodiment, wastewater treatment can include methods to purify the wastewater before reinjection or surface release. These purification methods may include reverse osmosis and nanofiltration. It is contemplated that two membrane separation, evaporation and precipitation technologies can be used to remove dissolved heavy metals, anions, organics and water in organics. It is further contemplated that absorption and air stripping can be used in the separation of dissolved organics and precipitation techniques. A recycling system may be deployed to minimize any groundwater pollution and for recycling material.

Nuclear reactor 26 may also be used for sequestration 172. See, for example, the discussion of this process in the paper *Carbon Neutral: 2020: A Leadership Opportunity in Canada's Oil Sands*, M. McCulloch, et al, The Pembina Institute, October 2006; and the paper *The CANiCAP Program*, Bill Gunter et al, Alberta Research Council Inc., April 2005, the paper *Canadian CO2 Capture & Storage Technology Roadmap*, R. Mitchel, Draft, February 2005. System 20 and the related methods disclosed substantially reduce the emission of GHG due to the elimination of combustion of fossil fuels from several operations. However, expenditure of fossil fuels may be emitted from operations such as retorting and upgrading 173. The capture and sequestration of such emission employ energy generated by nuclear reactor 26. The energy may be used in capture, pipeline transportation of captured GHG to areas with suitable sequestration characteristics and energy for injection of GHGs into those formations. Further, carbon dioxide could be piped in areas where enhanced oil recovery may be conducted. Energy is used to pipeline operations, inject carbon dioxide into the depleted conventional oil fields, recover oil from the enhanced oil recovery operation, separate carbon dioxide from recovered oil and reinject carbon dioxide as appropriate.

Nuclear reactor 26 may also be used for gasification 174 and hydrogen upgrade 176. See, for example, the discussion of these processes in the paper *Gasification in the Canadian Oil Sands: the Long Lake Integrated Upgrading Project*, P. Rettger, et al, presented at Gasification Technologies, Washington D.C., October 2004; and the paper *The Advanced High-Temperature Reactor (AHTR) for Producing Hydrogen to Manufacture Liquid Fuels*, C. W. Forsberg et al, ANES.2004. Paper, Sep. 9, 2004, the contents of these papers being incorporated herein by reference in their respective entireties. It is contemplated that system 20 employs gasification technologies to produce hydrogen and thermal energy to the upgrader. System 20 integrates an asphaltene gasification unit into the upgrader system to provide hydrogen to the hydrocracker and fuel for power and steam generation. It is envisioned that nuclear reactor 26 provides hydrogen and thermal energy to operate an upgrader, as well as the energy to separate air and provide a supply of pure oxygen to the gasifier.

Large quantities of hydrogen are required to convert heavy oils and oil sands to liquid fuels. Nuclear energy from nuclear reactor 26 can also be used to produce hydrogen. It is envisioned that efficient methods to produce hydrogen from nuclear energy include thermochemical cycles in which high-temperature heat (700 to 850° C.) and water are converted to hydrogen and oxygen. The peak nuclear reactor fuel and coolant temperatures are significantly higher than the chemical process temperatures to transport heat from the reactor core to an intermediate heat transfer loop, and from the intermediate heat transfer loop to the chemical plant. Other methods of producing hydrogen can include electrolytic methods which can be powered by electric output from nuclear reactor 26.

Figure 6:
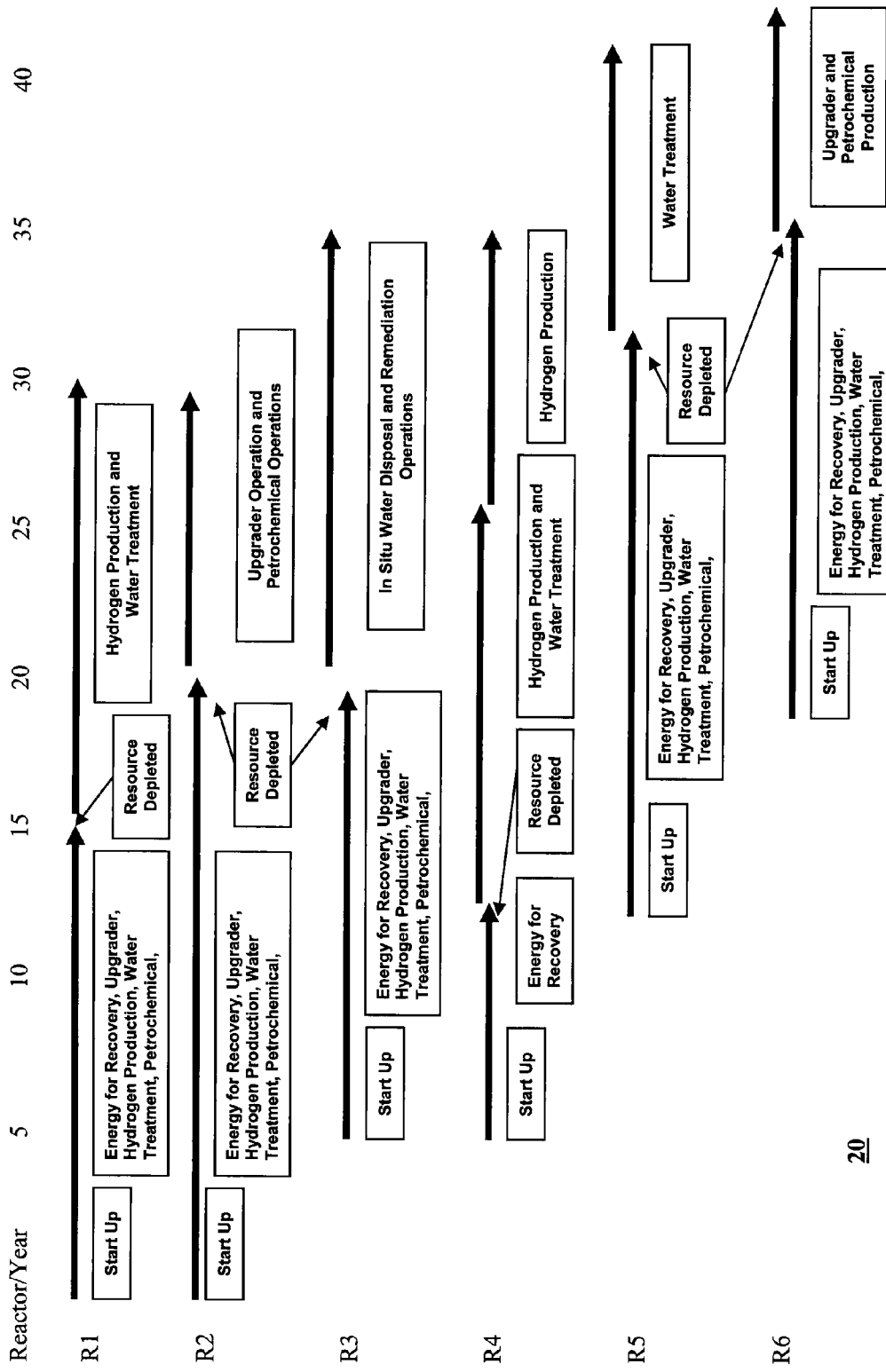
FIG. 6 is a schematic diagram of a recovery timeline in connection with the method and system shown in FIG. 1.

Referring to FIG. 6, an alternate embodiment of system 20 is shown, which utilizes multiple reactors 26 (FIG. 2), e.g., $R_1, R_2, R_3, R_4, R_5, R_6$. To overcome the limitations of physical thermal heat transfer and overall efficiency, nuclear reactors $R_1$-$R_6$ are sized to service the particular requirements of the selected site and oil sands formation to be treated. For example, in some locations small reactors (20 MWt to 500 MWt) are employed to provide the energy. Therefore, reactor sizing and siting reflect those parameters. Alternatively, an upgrader/refinery combination site, employing a larger reactor may be appropriate. Accordingly, system 20 and its corresponding method of use recovers hydrocarbon products from oil sands formations employing a cascading deployment in which an overall plan is employed for a long term schedule of reactor permitting, construction and startups and the evolution of each reactor's functions including associated systems, products and clients.

In the cascading deployment of nuclear reactors $R_1$-$R_6$, energy is economically provided to the various components of system 20 mode over a period of time, including periods of time that may range from 5-40 years. Other periods of time are also contemplated. For example, if one of reactors $R_1$-$R_6$ is sited in an area where the primary mode of operation is to produce bitumen from an oil sands formation, but the resources are being economically depleted, then that particular reactor is shifted for use in, among other activities, generating hydrogen, supporting water treatment, generating electricity for sale into the electric markets and/or performing sequestration functions. Accordingly, system 20 and its corresponding method of use advantageously recovers hydrocarbon products from oil sands formations by employing cascading deployment as a method of timing the energy deployment and energy application mode of use for nuclear reactor $R_1$-$R_6$.

In another aspect of system 20, the bitumen recovery operations employing the material distribution system described and injection/production wells 38 are initiated. Nuclear reactor 26 and the material distribution system are run. As shown in FIG. 1, system 20 employs a cyclic steam stimulation process (CSS), which includes wells 38 drilled with infrastructure 39. Wells 38 also may include hot material injectors that are designed to disperse thermal energy, such as steam 36 into thermal area 44 to decrease viscosity of bitumen and the oil sands formation. Such hot material injectors may be multi-sleeved pipes with slots to provide maximum dispersal of thermal energy.

In a first or injection stage of the CSS process, steam 36 is injected into the oils sands formation of thermal area 44 to decrease viscosity of the oil sands to release bitumen. It is contemplated that the material injected into thermal area 44 may include steam 36 and/or solvents or other substances, as discussed. It is further contemplated that steam 36 is injected at temperatures approximately 300 degrees Celsius or greater for a period of weeks to months. After injection, in a second stage, the injected oil sands formation of thermal area 44 is allowed to soak for a period of days to weeks, which allows heat from the injected materials to soak in the formation to further release bitumen. In a third or production stage, as shown in FIG. 1, hot oil including recoverable bitumen is extracted from thermal area 44. Nuclear reactor 26 delivers electrical energy to pumps 30. Pumps 30 pump the hot oil and recoverable bitumen from thermal area 44 via injection/production wells 38, as is known to one skilled in the art of system 20, which includes a bitumen recovery system. As the bitumen flows downward it is captured in a bitumen recovery system 160, which includes injection/production wells 38. The hot oil and recoverable bitumen may be pumped out or can be extracted by natural flow or other methods.

In an alternate embodiment of the first or injection stage, the CSS bitumen recovery operations of system 20 employ the supercritical material system, described with regard to FIG. 3, and fracturing wells 438. In the injection stage, supercritical material 436 is injected into the oil sands formation of thermal area 44 to decrease viscosity of the oil sands to release bitumen.

Bitumen recovery system 160 is constructed at site 22. Bitumen recovery system 160 may be a conventional hydrocarbon recovery system or other suitable system that addresses the recovery requirements and is coupled with injection/production wells 38 (or alternatively, the production wells of oil sands fracturing wells 438), as is known to one skilled in the art, for collection of bitumen that is released during the CSS process.

Bitumen recovery system 160 collects extracted bitumen for recovery and upgrade. See, for example, the discussion of recovery and upgrade in the paper *Bitumen & Very Heavy Crude Upgrading Technology: A Review Of Long Term R&D Opportunities*, Len Flint, LENEF Consulting Limited, March 2004, the contents of which being hereby incorporated by reference herein in its entirety.

A recovery plant or system (not shown, however, such a recovery plant or system may be incorporated with bitumen recovery system 160) is used to upgrade bitumen to hydrocarbons that can be used in refineries or the general hydrocarbon markets. Upgrading converts bitumen from a viscous liquid to higher quality synthetic crude that is used as feedstock for refineries. It is contemplated that the recovery plant or system is powered by thermal energy and electric energy 162 produced by nuclear reactor 26. The recovery plant or system can be located at site 22 or delivered, via pipeline or transport, for example, to an off-site upgrading facility.

After the bitumen is extracted, it can be upgraded for processing in refineries. Upgrading includes removing carbon from the bitumen while adding hydrogen to produce a more valuable hydrocarbon product. For example, the upgrading process breaks long hydrocarbon chains into smaller hydrocarbons. Upgrading can include: coking, which removes carbon and breaks down the bitumen by employing temperatures of approximately 500° C. to crack the bitumen. It is contemplated that hydrocracking, whereby hydrogen is added with a catalyst to crack the bitumen, may also be used, or a combination of coking and hydrocracking.

Upgrading can also include: distillation, which sorts mixtures of hydrocarbon molecules into their components; catalytic conversions, which transform hydrocarbons into more valuable forms; and hydrotreating, which removes sulphur and nitrogen and adds hydrogen to molecules. It is envisioned that hydrogen is a feedstock. It is further envisioned that the nitrogen is removed as ammonia and used as a fuel and the sulphur converted to elemental sulphur.

The end product is synthetic crude oil (SCO), which may be shipped by underground pipelines to refineries to be refined further into jet fuels, gasoline and other petroleum products and petroleum chemical products like plastics, fleece, toothpaste, etc. For example, the recovered bitumen is deficient in hydrogen, compared with typical crude oils, which contain approximately 14 percent hydrogen. To make it an acceptable feedstock for conventional refineries, the recovered bitumen is upgraded into higher quality SCO, through the addition of hydrogen or the rejection of carbon, or both. Upgrading bitumen utilizes natural gas as a source of heat and steam for processing, and also as a source of hydrogen for hydroprocessing. Varying amounts of hydrogen may be required.

It is contemplated that the upgrading process can include two steps. First, the primary upgrading, this is done by coking, or the ebullated bed process. The primary upgrade leaves significant sulphur and nitrogen compounds in the lighter products. Primary upgrading is based on coking, a carbon removal process, whereby the bitumen is cracked by using heat and special catalytic processes, thus forming lighter oils and coke. The ebullated bed process is a residue conversion process that employs hydrogen addition. Secondary upgrading can include sulphur and nitrogen reduction.

Alternative primary upgrading can include visbreaking and deasphalting. Visbreaking is a process designed to reduce residue viscosity by thermal means, without appreciable coke formation. Deasphalting uses light solvents to selectively reject highly aromatic or asphaltenic fractions. Other processes may employ partially upgraded bitumen, followed by conventional hydrocracking and gasification.

It is contemplated that system 20 may employ a CSS process that incorporates a steam drive between an injector well and a producer well. Combinations of vertical and horizontal wells may also be used. It is further contemplated that the CSS process of system 20 may yield steam-to-oil ratios, an economic factor, of 3:1 to 4:1. It is envisioned that the CSS process of system 20 can recover 20 to 25 percent of the initial oil in-place.

Figure 7:
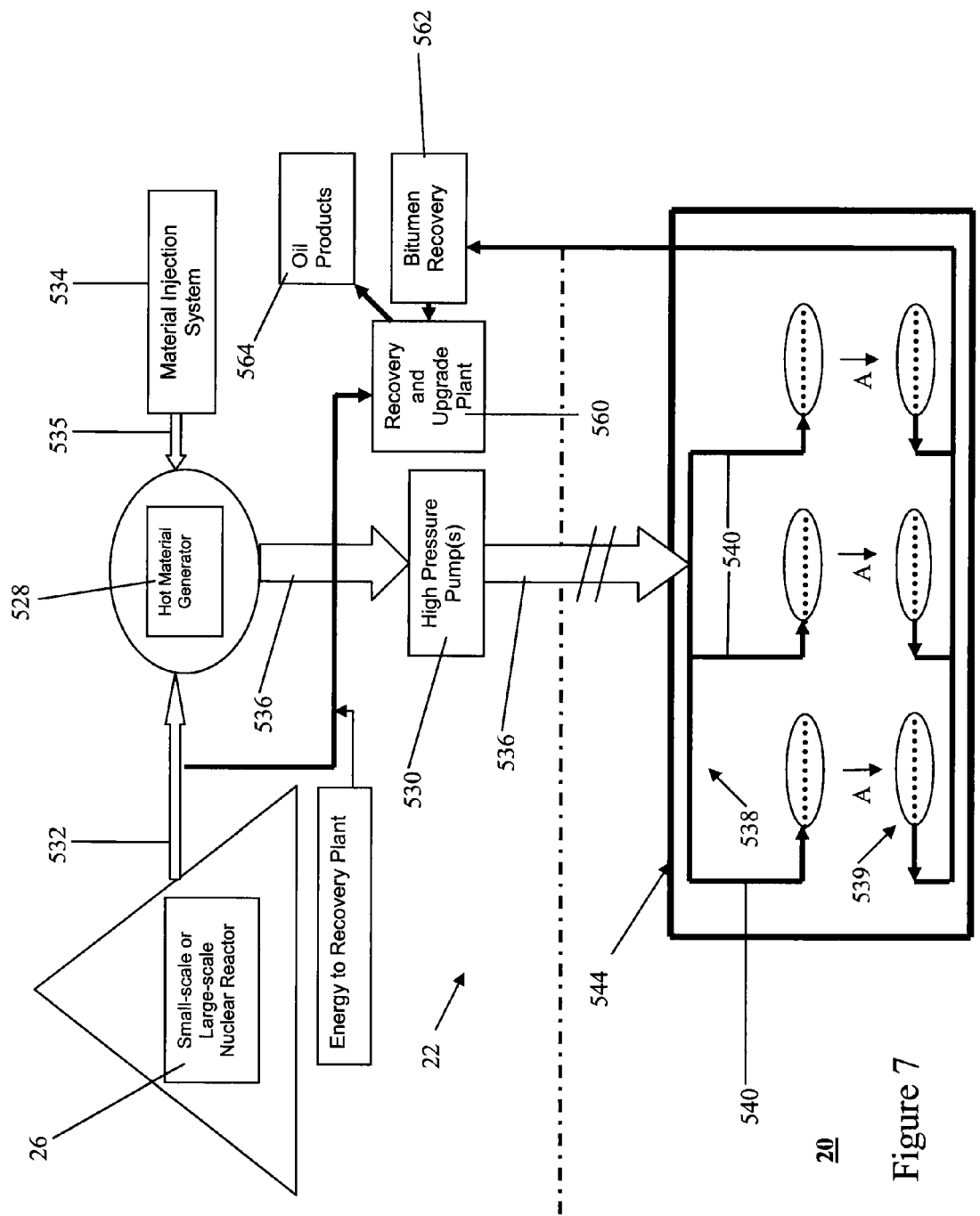
FIG. 7 is a schematic diagram of an alternate embodiment of the method and system shown in FIG. 1.
Figure 7A:
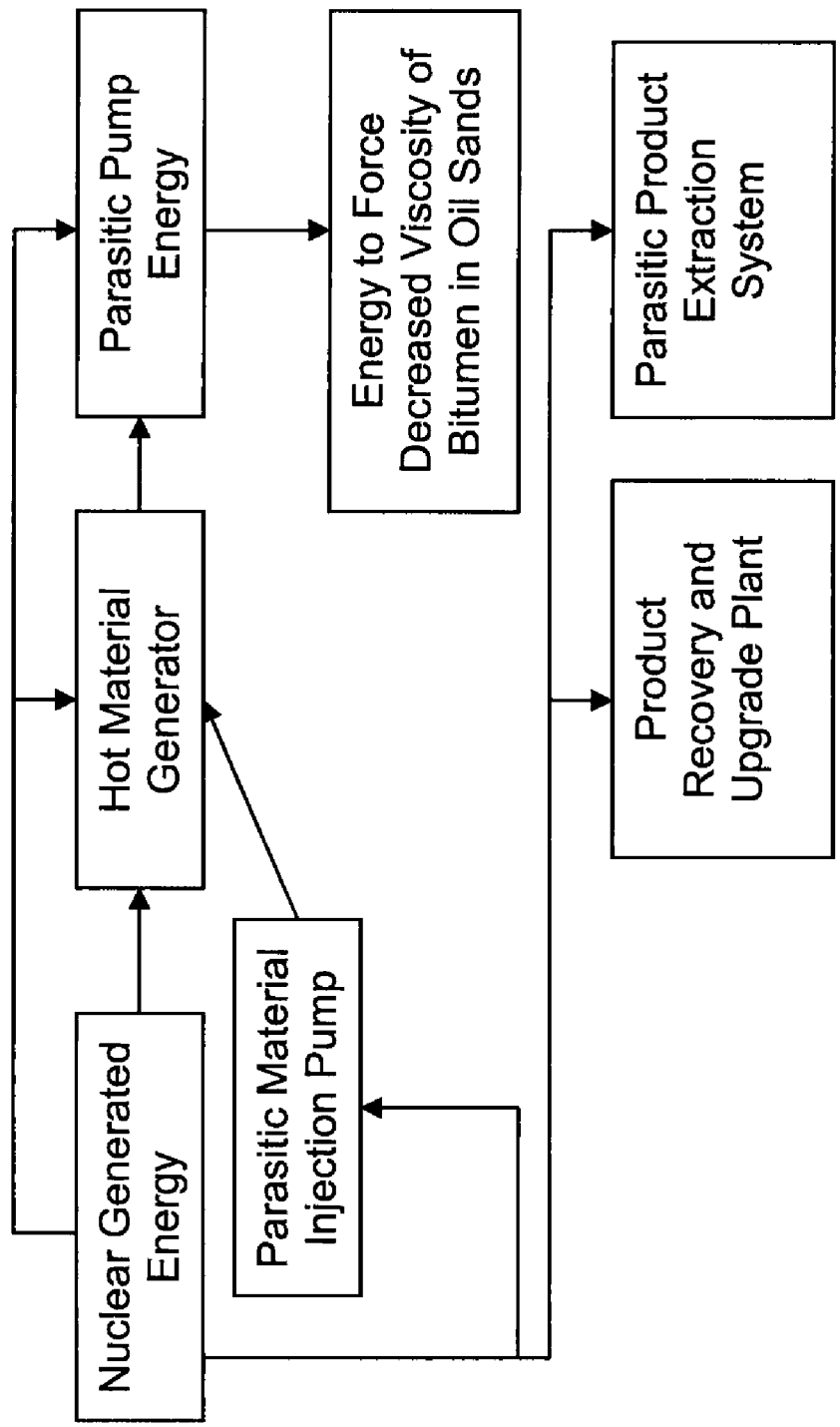
FIG. 7a is a process energy flow diagram in connection with the method and system shown in FIG. 7.

Referring to FIGS. 7 and 7*a*, an alternate embodiment of system 20 employs steam assisted gravity drainage (SAGD). See, for example, the discussion of the SAGD process in the paper OPTI Long Lake Project, *Application for Commercial Approval*, Technical Information, December 2000, Volume 1, the contents of which being hereby incorporated by reference herein in its entirety. It is envisioned that SAGD may be advantageously employed in high permeability reservoirs, resulting in lower injection pressures and lower steam-to-oil ratios, as well other locations.

In a SAGD process employed by system 20, installation and related construction of nuclear reactor 26 and the components of the thermal transfer system at site 22 is performed, similar to that described above.

A hot material generator 528 is constructed and installed at site 22, as is known to one skilled in the art. Nuclear reactor 26 is coupled to hot material generator 528, as is known to one skilled in the art, for the transfer of thermal energy 532. Material supply source 534 delivers water 535 to hot material generator 528. System 20 employs hot material generator 528, in cooperation with nuclear reactor 26 as the thermal source, to produce steam 536 for injection with the oil sands formations. It is envisioned that a supercritical material distribution system may be employed similar to that described above.

High pressure pumps 530 are installed at site 22 and coupled to hot material generator 528 for injecting steam 536 into the oil sands formations. It is contemplated that material supply source may also provide nitrogen, methane, ethane, propane, butane, air, carbon dioxide, natural gas, flue gas, oxygen, nitrogen, acetic acid and/or other solvents. Other vapor extraction materials are also included. The injected material may also be used to support a fire flood technology as well.

Infrastructure 39 (FIG. 1) is formed by drilling horizontal wells in the oil sands formation. The horizontal wells include an upper well 538 and a lower well 539. It is contemplated that several horizontal well pairs can be drilled with infrastructure 39 extending as long as 1,000 meters horizontally into the oil sands formation, and may be disposed about 5 meters apart vertically. High pressure pumps 530 deliver steam 536 to upper well 538 at high pressure.

Steam 536 is injected into the oil sands formation from upper well 538. Upper well 538 includes hot material injectors 540, which are configured to disperse thermal energy with thermal area 544 to decrease the viscosity of the bitumen in the oil sands formation. It is contemplated that hot material injectors 540 may be multi-sleeved pipes with slots allowing for maximum dispersal of the thermal energy into the oil sands formation.

Hot material injectors 540 inject steam 536 to warm up thermal area 544, similar to thermal area 44 discussed above, to reduce the viscosity and mobilize an expanding zone of bitumen in situ, which is then produced through lower well 539. As the bitumen flows downward, in direction shown by arrows A, to lower well 539, it is captured in a bitumen recovery system 560, similar to bitumen recovery system 160 discussed above. The viscosity of the bitumen may also be reduced in secondary operations.

Nuclear reactor 26 is coupled to bitumen recovery system 560, as is known to one skilled in the art, for the transfer of thermal energy 532 thereto. Thermal energy 532 provides sufficient energy such that bitumen recovery system 560 performs recovery operations. High pressure pumps 530 deliver recovered bitumen to bitumen recovery system 560, which collects extracted bitumen 562 for recovery and upgrade. Oil products 564 can be transported to a processing plant via pipeline, etc. Hot oil and recoverable bitumen may be pumped out or can be extracted by natural flow or other methods. It is envisioned that a heated hydrocarbon solvent may be delivered to upper well 538. In the SAGD process, recovery may be in the 40-70% range.

It is contemplated that the SAGD process may be supplemented with a solvent assisted process (SAP) in which solvents, including organic and inorganic solvents may be mixed with steam 536. In an alternate embodiment, a vapor extraction process (VAPEX) and other SAPs, can be employed, similar to the SAGD process. In a VAPEX process, a solvent such as ethane, propane, or butane, is injected into the oil sands reservoir along with a displacement gas to mobilize the hydrocarbons in the reservoir and move them toward lower well 539. The VAPEX process advantageously avoids water processing and recycling, offers lower carbon dioxide emissions, can be operated at reservoir temperatures with limited heat loss and at reduced cost.

System 20, whether during in situ or post mining, can include an expanding solvent SAGD (ES-SAGD), low pressure solvent SAGD, tapered steam solvent SAGD (TSS-SAGD), steam and gas push (SAGP), hot water extraction, modified hot water extraction, two stage flotation process, RTR processing, direct retorting, Taciuk processing, Lurgi processing, SESA solvent extraction processing, Dravo processing and Kruyer processing, among others may be employed. It is envisioned that the method employed can be a function of localized geologic characteristics.

Figure 8:
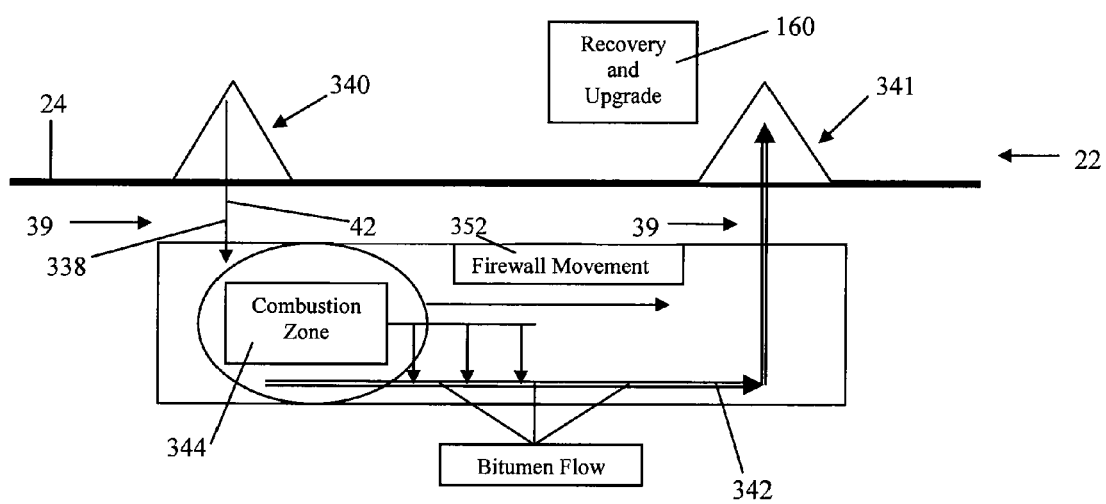
FIG. 8 is a schematic diagram of another alternate embodiment of the method and system shown in FIG. 1.
Figure 9:
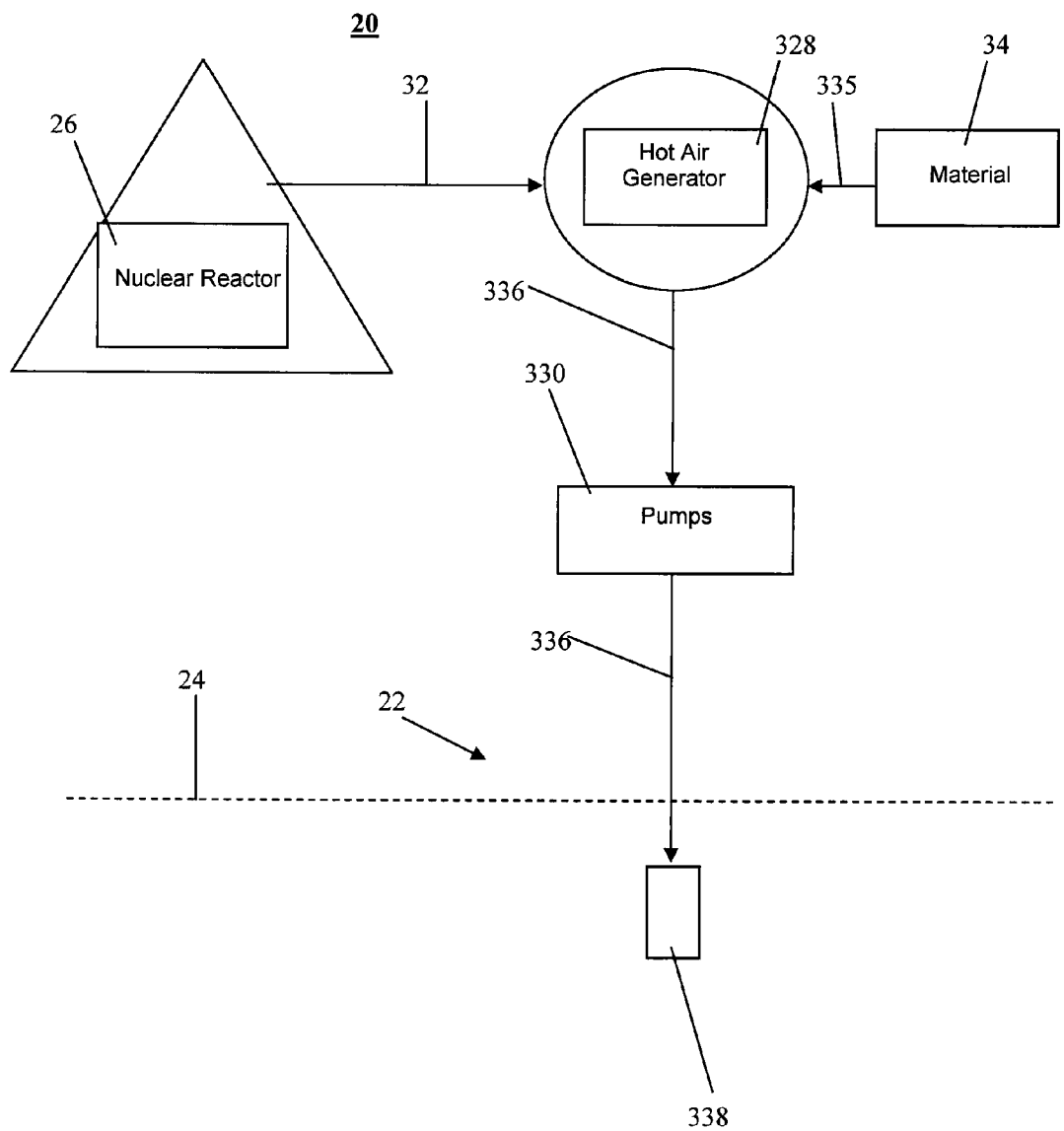
FIG. 9 is a schematic diagram of the components of the method and system shown in FIG. 8, in the injection stage.
Figure 10:
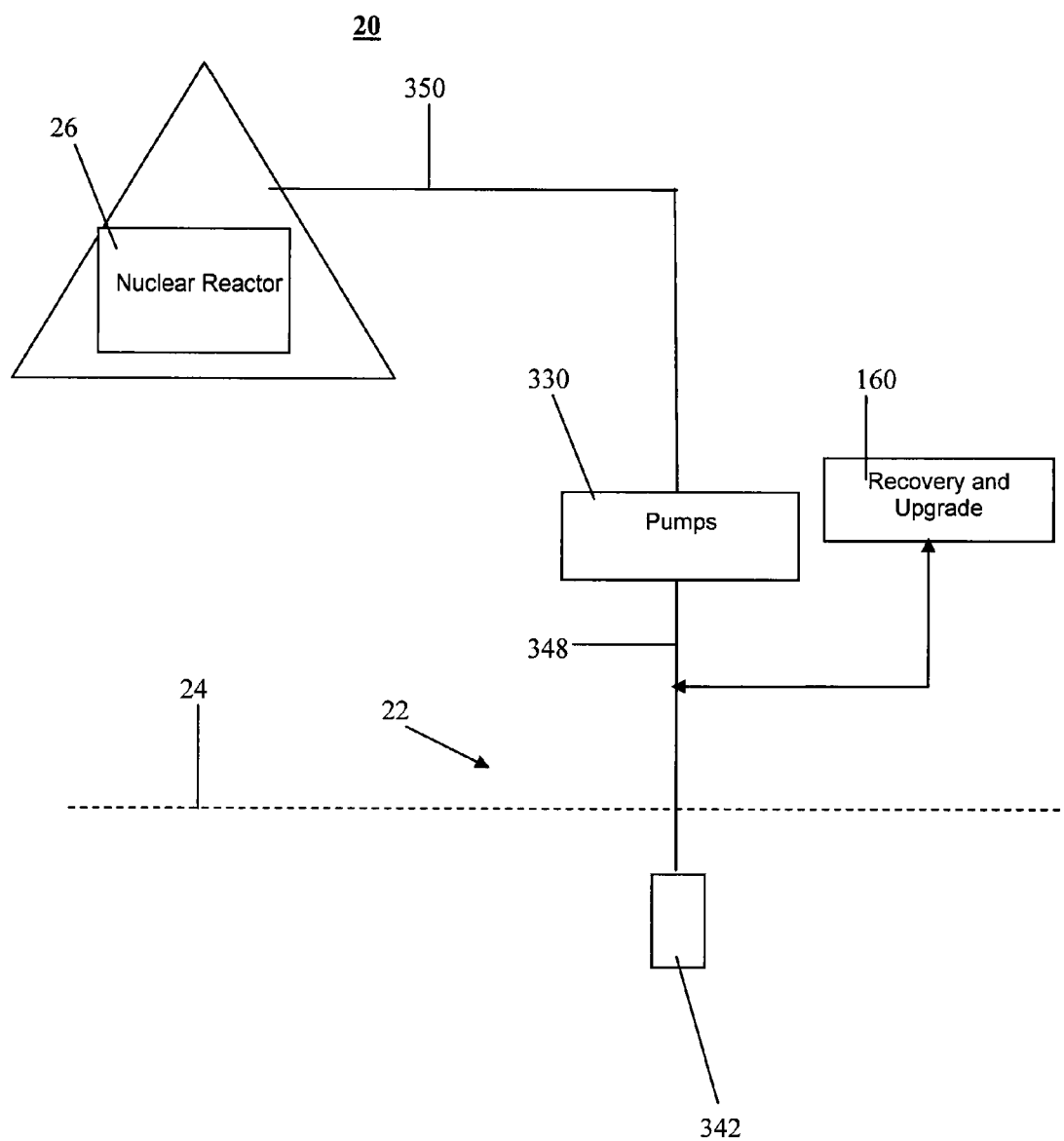
FIG. 10 is a schematic diagram of the components of the method and system shown in FIG. 8, in the production stage.

In another alternate embodiment, as shown in FIGS. 6-8, system 20 employs a toe to heal air injection (THAI) process, employing similar components to that described in FIGS. 1-3, in which hot air is injected into the oil sands formation. See, for example, discussion of the THAI process in the publication, *Petrobank Strengthens Oil Sands Resource Base*, Calgary, Alberta, June 2006, the contents of which being hereby incorporated by reference herein in its entirety. Installation and related construction of nuclear reactor 26 and the components of the thermal transfer system at site 22 is performed, similar to that described above.

A hot air generator 328 is constructed and installed at site 22, as is known to one skilled in the art. Nuclear reactor 26 is coupled to hot air generator 328, as is known to one skilled in the art, for the transfer of thermal energy 32. Material supply source 34 delivers air 335 to hot air generator 328. System 20 employs hot air generator 328, in cooperation with nuclear reactor 26 as the thermal source, to produce hot air 336 for injection with the oil sands formations.

High pressure pumps 330 are installed at site 22 and coupled to hot air generator 328 for injecting hot air 336 into the oil sands formations. High pressure pumps 330 deliver hot air 36 to an injection well 338 at high pressure. Hot air 336 is delivered at high pressures to the oil sands formations to ignite oil sands in the reservoir, thereby creating a vertical wall of burning crude (firefront).

Infrastructure 39 for injection well 338 is constructed at site 22. A drilling rig 340 with equipment designed for accurate directional drilling is brought on site. Drilling rig 340 is disposed adjacent surface 24 of site 22 to form a vertical drill hole 42. Injection well 338 is installed with infrastructure 39 of site 22. Injection well 338 injects hot air 336 into the oil sands formation and site 22 to ignite oil sands in the reservoir.

A combustion zone 344 is mapped out to define a space of the oil sands formation at site 22 for thermal application of system 20. Combustion zone 344 defines a location for disposition of injection well 338 to introduce hot air 336 from pumps 330. Such thermal energy decreases the viscosity of the bitumen of the oil sands formations for recovery as discussed. The THAI process ignites oil sands in the reservoir, thereby creating a vertical wall 352 of burning oil sands deposit (firefront) that partially upgrades the bitumen and drains the oil to a producing horizontal well 342, disposed below the firefront. Horizontal well 342 is formed with infrastructure 39 using a drilling rig 341, disposed adjacent surface 24 of site 22. It is contemplated that the THAI process may utilize a catalyst in horizontal well 342 to promote the precipitation of asphaltenes and upgrade the bitumen in situ.

As the bitumen flows downward to horizontal well 342, it is captured in a bitumen recovery system 160, similar to that discussed, which includes horizontal well 342. The hot oil and recoverable bitumen may be pumped out or can be extracted by natural flow or other methods. Pump energy 348 receives electric power 350 to place hot air 336 under high pressure. Pump energy 348 also delivers recovered bitumen to bitumen recovery system 160. Bitumen recovery system 160 collects extracted bitumen for recovery and upgrade.

Figure 11:
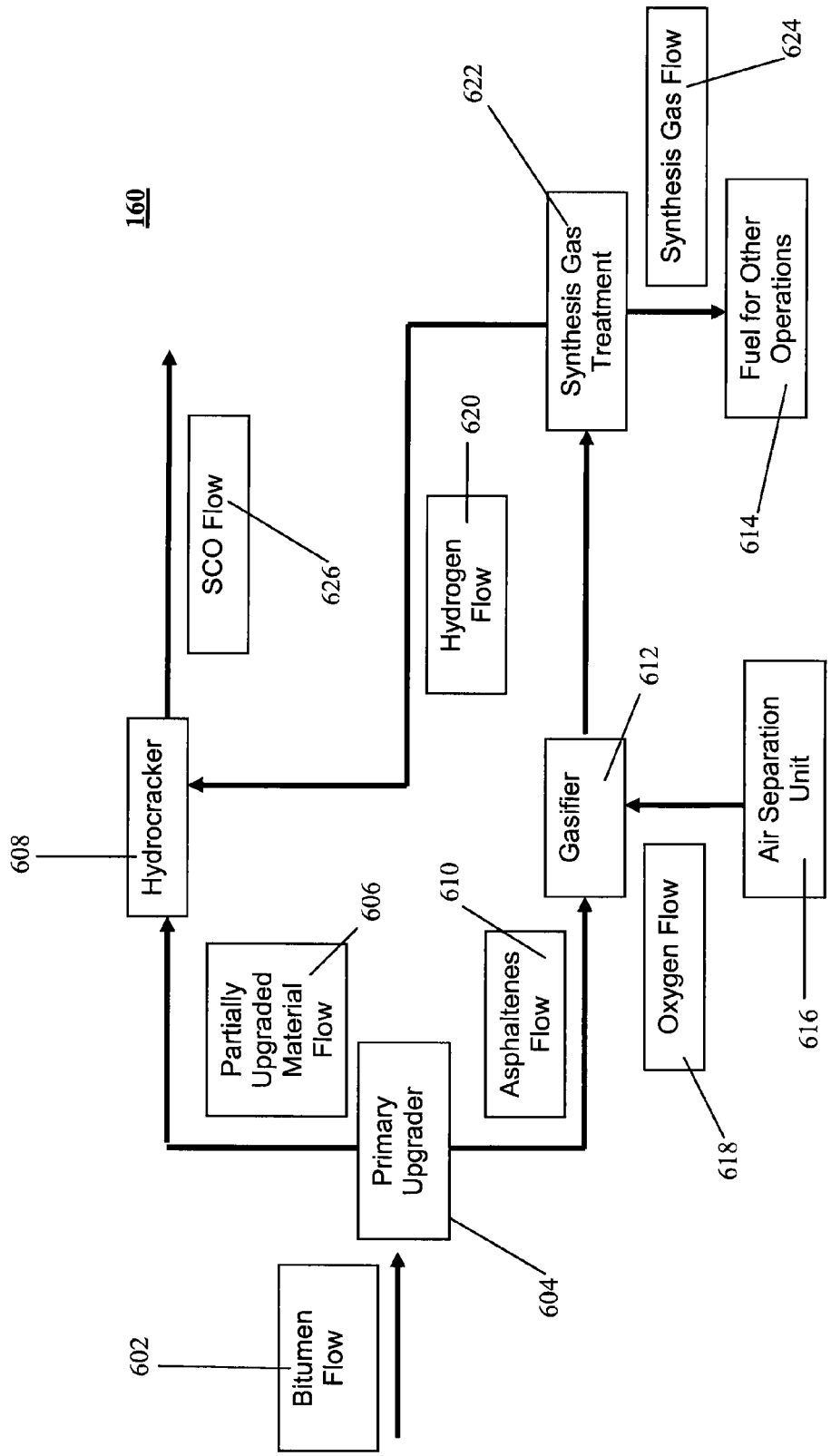
FIG. 11 is a process energy flow diagram of an alternate embodiment for recovery in connection with the method and system shown in FIG. 1.

In another alternate embodiment of system 20 and the related methods of use, as shown in FIG. 11, bitumen recovery system 160 provides hydrogen as an alternative to reformation of natural gas to produce hydrogen. In this embodiment, bitumen recovery system 160 similar to that discussed above, employs gasification and hydrogen upgrade, similar to gasification 174 and hydrogen upgrade 176 discussed above with regard to FIG. 4, to collect extracted bitumen for recovery and upgrade from an oil sands formation.

Upon extraction of bitumen from site 22 (FIG. 1), a bitumen flow 602 is delivered to a primary upgrader 604. Primary upgrader 604 delivers partially upgraded material flow 606 to a hydrocracker 608, similar to that discussed above, and an asphaltene flow 610 to a gasifier 612. Bitumen recovery system 160 includes gasifier 612. Gasifier 612 is integrated with system 20 and configured as an asphaltene gasification unit to provide hydrogen to hydrocracker 608 for secondary upgrading and fuel 614 for power and steam generation in connection system 20.

An air separation unit 616 provides high purity oxygen flow 618 and other utility services to facilitate conversion of the liquid asphaltene by-product stream of asphaltene flow 610 into hydrogen. Gasifier 612 delivers hydrogen flow 620 to hydrocracker 608 for secondary upgrading and to a synthesis gas treatment unit 622 to provide a synthesis gas flow 624 and fuel 614. The configuration of bitumen recovery system 160, which includes primary upgrader 604 and hydrocracker 608 advantageously provides an integrated project to produce premium SCO flow 626. It is contemplated that the SCO may be shipped and refined into other petroleum products as discussed herein. It is envisioned that nuclear reactor 26, discussed above, provides hydrogen, thermal energy and electrical energy to operate the components of bitumen recovery system 160 such as primary upgrader 604, hydrocracker 608, gasifier 612, air separation unit 616 and synthesis gas treatment unit 622.

It will be understood that various modifications may be made to the embodiments disclosed herein. Therefore, the above description should not be construed as limiting, but merely as exemplification of the various embodiments. Those skilled in the art will envision other modifications within the scope and spirit of the claims appended hereto.

What is claimed is:

1. A method for recovering hydrocarbon products, the method comprising the steps of:
   producing thermal energy using a nuclear reactor;
   providing said thermal energy to a hot material generator;
   providing a material to said hot material generator;
   producing a hot material flow comprising high pressure steam from said hot material generator using a high pressure pump;
   delivering said hot material flow into wells wherein said wells are disposed in an oil sands formation;
   injecting said hot material flow into said oil sands formation from said wells to reduce the viscosity of bitumen of the oil sands formation such that said bitumen is caused to flow; and
   recovering bitumen from said oil sand formation using said hot material flow from said wells.

2. A method as recited in claim 1, further comprising the step of soaking the oil sands formation with the injected hot material flow for a period of time.

3. A method as recited in claim 1, further comprising the steps of:
   converting the thermal energy of said nuclear reactor into electrical energy; and
   powering the high pressure pumps with said electrical energy.

4. A method as recited in claim 1, further comprising the step of constructing an infrastructure in said oil sands formation, said infrastructure being formed by drilling horizontal wells in said oil sands formation, said wells including an upper well and a lower well.

5. A method as recited in claim 4, wherein the step of delivering includes delivering said heated material flow into said upper well, the step of injecting includes injecting said heated material flow into said oil sands formation from said upper well, and the step of recovering includes recovering bitumen that flows into said lower well.

6. A method as recited in claim 5, wherein the step of delivering said heated material flow into said upper well includes delivering a hydrocarbon solvent to said upper well.

7. A method as recited in claim 1, further comprising the step of upgrading said bitumen for processing to produce hydrocarbon products.

8. A method for recovering bitumen from an oil sands formation, the method comprising the steps of:
   producing thermal energy using a nuclear reactor;
   providing said thermal energy to a hot material generator;
   providing water to said hot material generator;
   producing a high pressure steam flow from said hot material generator using a high pressure pump;
   converting said thermal energy of said nuclear reactor into electrical energy;

powering said high pressure pumps with said electrical energy;
constructing an infrastructure in said oil sands formation for disposal of wells, said infrastructure being formed by drilling horizontal wells in said oil sands formation, said wells including an upper well and a lower well;
delivering said high pressure steam flow into said wells wherein said wells are disposed in an oil sands formation and said high pressure steam is injected into a thermal area of said oil sands formation;
injecting said high pressure steam flow into said thermal area from said wells to reduce the viscosity of bitumen of the oil sands formation such that said bitumen is caused to flow;
recovering bitumen from said oil sands from said wells; and
upgrading said bitumen for processing to produce hydrocarbon products.

9. A method as recited in claim 8, wherein the step of delivering includes delivering a heated material flow into said upper well, the step of injecting includes injecting said heated material flow into said oil sands formation from said upper well, and the step of recovering includes recovering bitumen that flows into said lower well.

10. A method as recited in claim 9, wherein the step of delivering said high pressure steam flow into said wells includes delivering a hydrocarbon solvent mixed with said high pressure steam to said upper well.

11. A method for recovering bitumen from an oil sands formation, the method comprising the steps of:
producing thermal energy using a nuclear reactor;
providing said thermal energy to a hot air generator;
providing air to said hot air generator;
producing a high pressure hot air flow from said hot air generator using a high pressure pump;
converting said thermal energy of said nuclear reactor into electrical energy;
powering said high pressure pumps with said electrical energy;
constructing an infrastructure in said oil sands formation, said infrastructure being formed by drilling a vertical well and a horizontal well in said oil sands formation;
delivering said high pressure hot air flow into said vertical well wherein said vertical well is disposed in said oil sands formation;
injecting said high pressure hot air flow into a thermal area of said oil sands formation from said vertical well so that said oil sands formation is ignited such that the viscosity of bitumen of the oil sands formation causes said bitumen to flow;
recovering said bitumen that flows into said horizontal well; and
upgrading said bitumen via gasification to add hydrogen to said bitumen.

\* \* \* \* \*